US012305516B2

(12) United States Patent
Sharma et al.

(10) Patent No.: US 12,305,516 B2
(45) Date of Patent: May 20, 2025

(54) GAS TURBINE ENGINE WITH A FLUID CONDUIT SYSTEM AND A METHOD OF OPERATING THE SAME

(71) Applicants: General Electric Company, Schenectady, NY (US); General Electric Deutschland Holding GmbH, Frankfurt (DE); General Electric Company Polska Sp. z o.o., Warsaw (PL)

(72) Inventors: Ashish Sharma, Munich (DE); Piotr Jerzy Kulinski, Warsaw (PL); Adam Tomasz Pazinski, Warsaw (PL); Tomasz Jan Bulsiewicz, Warsaw (PL); Scott Alan Schimmels, Miamisburg, OH (US)

(73) Assignees: General Electric Company, Evendale, OH (US); General Electric Deutschland Holding GmbH, Frankfurt (DE); General Electric Company Polska Sp. z o.o, Warsaw (PL)

( * ) Notice: Subject to any disclaimer, the term of this patent is extended or adjusted under 35 U.S.C. 154(b) by 33 days.

(21) Appl. No.: 18/452,764

(22) Filed: Aug. 21, 2023

(65) Prior Publication Data

US 2023/0407758 A1 Dec. 21, 2023

Related U.S. Application Data

(62) Division of application No. 17/561,203, filed on Dec. 23, 2021, now Pat. No. 11,859,500.

(30) Foreign Application Priority Data

Nov. 5, 2021 (PL) ........................................ 439448

(51) Int. Cl.
*F01D 11/24* (2006.01)

(52) U.S. Cl.
CPC .......... *F01D 11/24* (2013.01); *F05D 2220/32* (2013.01); *F05D 2240/55* (2013.01); *F05D 2260/213* (2013.01)

(58) Field of Classification Search
CPC .... F02C 9/18; F02C 7/18; F01D 11/24; F05D 2220/32; F05D 2240/55; F05D 2260/213
See application file for complete search history.

(56) References Cited

U.S. PATENT DOCUMENTS 4,317,646 A 3/1982 Steel et al.
4,363,599 A 12/1982 Cline et al.
(Continued)

FOREIGN PATENT DOCUMENTS

CN 109229337 A 1/2019

*Primary Examiner* — David E Sosnowski
*Assistant Examiner* — Theodore C Ribadeneyra
(74) *Attorney, Agent, or Firm* — Dority & Manning, P.A.

(57) ABSTRACT

A method of operating a gas turbine engine comprising: extracting a flow of air from a compressor section of the gas turbine engine into a first conduit; flowing the extracted flow of air through the first conduit to a first location at a turbine section of the turbine section, wherein a second conduit is in fluid communication with the turbine section at a second location; flowing a heat transfer fluid to a first heat exchanger positioned in thermal communication with the flow of air through the first conduit, the heat transfer fluid in thermal communication with the extracted flow of air through the first conduit via the first heat exchanger; and modulating, via a flow control device, a portion of the flow of air extracted from the first conduit to the second conduit downstream of the first heat exchanger.

13 Claims, 22 Drawing Sheets

(56) References Cited

U.S. PATENT DOCUMENTS

| | | | |
|---|---|---|---|
| 5,100,291 | A | 3/1992 | Glover |
| 5,116,199 | A | 5/1992 | Ciokajlo |
| 5,123,242 | A | 6/1992 | Miller |
| 5,127,795 | A | 7/1992 | Plemmons et al. |
| 5,205,115 | A | 4/1993 | Plemmons et al. |
| 5,205,708 | A | 4/1993 | Plemmons et al. |
| 5,219,268 | A | 6/1993 | Johnson |
| 5,281,085 | A | 1/1994 | Lenahan et al. |
| 5,498,126 | A | 3/1996 | Pighetti et al. |
| 6,035,929 | A | 3/2000 | Friedel et al. |
| 6,098,395 | A | 8/2000 | North |
| 6,241,467 | B1 | 6/2001 | Zelesky et al. |
| 6,412,270 | B1 | 7/2002 | Mortzheim et al. |
| 6,666,645 | B1 | 12/2003 | Arilla et al. |
| 6,726,446 | B2 | 4/2004 | Arilla et al. |
| 6,896,038 | B2 | 3/2005 | Arilla et al. |
| 6,938,422 | B2 | 9/2005 | Thorn |
| 7,114,914 | B2 | 10/2006 | Gendraud et al. |
| 7,287,955 | B2 | 10/2007 | Amiot et al. |
| 7,309,209 | B2 | 12/2007 | Amiot et al. |
| 7,367,776 | B2 | 5/2008 | Albers et al. |
| 7,431,557 | B2 | 10/2008 | Herron et al. |
| 7,491,029 | B2 | 2/2009 | Pezzetti, Jr. et al. |
| 7,503,179 | B2 | 3/2009 | Estridge et al. |
| 7,597,537 | B2 | 10/2009 | Bucaro et al. |
| 7,740,443 | B2 | 6/2010 | Seitzer et al. |
| 7,819,626 | B2 | 10/2010 | Lee et al. |
| 7,823,389 | B2 | 11/2010 | Seitzer et al. |
| 7,837,429 | B2 | 11/2010 | Zhang et al. |
| 7,891,938 | B2 | 2/2011 | Herron et al. |
| 8,011,879 | B2 | 9/2011 | Guimbard et al. |
| 8,057,157 | B2 | 11/2011 | Roush et al. |
| 8,092,146 | B2 | 1/2012 | Legare et al. |
| 8,126,628 | B2 | 2/2012 | Hershey et al. |
| 8,221,061 | B2 | 7/2012 | Massot et al. |
| 8,414,255 | B2 | 4/2013 | Ireland et al. |
| 8,652,602 | B1 | 2/2014 | Dolla |
| 8,662,828 | B2 | 3/2014 | Gendraud et al. |
| 8,776,530 | B2 | 7/2014 | Shirooni et al. |
| 8,936,429 | B2 | 1/2015 | Gaully et al. |
| 9,097,134 | B2 | 8/2015 | Ferch et al. |
| 9,145,774 | B2 | 9/2015 | Fuchs et al. |
| 9,151,226 | B2 | 10/2015 | Zimmermann et al. |
| 9,157,331 | B2 | 10/2015 | Laurello |
| 9,316,111 | B2 | 4/2016 | Eleftheriou et al. |
| 9,341,074 | B2 | 5/2016 | Schimmels et al. |
| 9,353,641 | B2 | 5/2016 | Philippot |
| 9,435,224 | B2 | 9/2016 | Raison et al. |
| 9,506,369 | B2 | 11/2016 | Boswell et al. |
| 9,534,505 | B2 | 1/2017 | Lucas |
| 9,677,412 | B2 | 6/2017 | Jones et al. |
| 9,869,196 | B2 | 1/2018 | Day et al. |
| 9,920,647 | B2 | 3/2018 | Jones et al. |
| 10,054,000 | B2 | 8/2018 | Garin et al. |
| 10,072,520 | B2 | 9/2018 | Pisacreta et al. |
| 10,414,507 | B2 | 9/2019 | Schelfaut |
| 10,415,421 | B2 | 9/2019 | Arnold et al. |
| 10,443,445 | B2 | 10/2019 | Liebl et al. |
| 10,487,689 | B2 | 11/2019 | Bonneau et al. |
| 10,513,944 | B2 | 12/2019 | Chaudhari et al. |
| 10,533,747 | B2 | 1/2020 | Corsmeier et al. |
| 10,544,803 | B2 | 1/2020 | Cunningham |
| 10,583,933 | B2 | 3/2020 | Elbibary et al. |
| 10,801,359 | B2 | 10/2020 | Blakeman et al. |
| 10,914,187 | B2 | 2/2021 | Eastwood et al. |
| 11,015,484 | B2 | 5/2021 | Lepretre et al. |
| 2002/0053837 | A1 | 5/2002 | Arilla et al. |
| 2005/0042080 | A1 | 2/2005 | Gendraud et al. |
| 2005/0158169 | A1 | 7/2005 | Amiot et al. |
| 2005/0276690 | A1 | 12/2005 | Amiot et al. |
| 2006/0165518 | A1 | 7/2006 | Albers et al. |
| 2007/0003410 | A1 | 1/2007 | Chehab |
| 2007/0086887 | A1 | 4/2007 | Pezzetti, Jr. et al. |
| 2007/0140838 | A1 | 6/2007 | Estridge et al. |
| 2007/0140839 | A1 | 6/2007 | Bucaro et al. |
| 2007/0264120 | A1 | 11/2007 | Amiot et al. |
| 2007/0276578 | A1 | 11/2007 | Herron et al. |
| 2008/0112797 | A1 | 5/2008 | Seitzer et al. |
| 2009/0037035 | A1 | 2/2009 | Hershey et al. |
| 2009/0064522 | A1 | 3/2009 | Herron et al. |
| 2009/0081029 | A1 | 3/2009 | Dalton et al. |
| 2010/0154434 | A1 | 6/2010 | Kubota et al. |
| 2010/0209231 | A1 | 8/2010 | Lewis |
| 2010/0218960 | A1 | 9/2010 | Dillman et al. |
| 2010/0232947 | A1 | 9/2010 | Ireland et al. |
| 2010/0247297 | A1 | 9/2010 | Legare et al. |
| 2011/0076135 | A1 | 3/2011 | Gendraud et al. |
| 2012/0003086 | A1 | 1/2012 | Morris et al. |
| 2012/0045317 | A1 | 2/2012 | Saladino |
| 2012/0167584 | A1 | 7/2012 | Philippot |
| 2013/0149123 | A1 | 6/2013 | Laurello |
| 2013/0156541 | A1 | 6/2013 | Eleftheriou et al. |
| 2013/0170966 | A1 | 7/2013 | Cook |
| 2013/0177414 | A1 | 7/2013 | Bonneau et al. |
| 2014/0013765 | A1 | 1/2014 | Studerus et al. |
| 2014/0030066 | A1 | 1/2014 | Schimmels et al. |
| 2014/0077116 | A1 | 3/2014 | Walker Santiago et al. |
| 2014/0157791 | A1 | 6/2014 | Saha et al. |
| 2014/0341707 | A1 | 11/2014 | Jones et al. |
| 2015/0275758 | A1 | 10/2015 | Foutch et al. |
| 2015/0292358 | A1 | 10/2015 | Ronan et al. |
| 2015/0354457 | A1 | 12/2015 | Rioux et al. |
| 2015/0354465 | A1 | 12/2015 | Suciu et al. |
| 2015/0361827 | A1 | 12/2015 | Pisacreta et al. |
| 2015/0361890 | A1 | 12/2015 | Suciu et al. |
| 2016/0003086 | A1 | 1/2016 | Day et al. |
| 2016/0169027 | A1 | 6/2016 | Jones |
| 2016/0376897 | A1 | 12/2016 | Spangler |
| 2016/0377091 | A1 | 12/2016 | Cortequisse |
| 2017/0114667 | A1 | 4/2017 | Sabo et al. |
| 2017/0167273 | A1 | 6/2017 | Maguire et al. |
| 2017/0175563 | A1 | 6/2017 | Chaudhari et al. |
| 2017/0211416 | A1 | 7/2017 | Weaver et al. |
| 2018/0038654 | A1 | 2/2018 | Popp et al. |
| 2018/0073435 | A1 | 3/2018 | Chen et al. |
| 2018/0134407 | A1 | 5/2018 | Elbibary et al. |
| 2018/0156056 | A1 | 6/2018 | Bonacum et al. |
| 2018/0216538 | A1 | 8/2018 | Papa et al. |
| 2018/0223684 | A1 | 8/2018 | Arnold et al. |
| 2018/0245471 | A1 | 8/2018 | Eriksson et al. |
| 2018/0245472 | A1 | 8/2018 | Spangler et al. |
| 2018/0291747 | A1 | 10/2018 | Pitt |
| 2018/0298758 | A1 | 10/2018 | Cunningham |
| 2018/0340474 | A1 | 11/2018 | Baladi et al. |
| 2018/0347468 | A1 | 12/2018 | Caimano et al. |
| 2019/0136708 | A1 | 5/2019 | Sebastian et al. |
| 2019/0153963 | A1 | 5/2019 | Kitaguchi |
| 2019/0257247 | A1 | 8/2019 | Pal et al. |
| 2019/0271237 | A1 | 9/2019 | Martin et al. |
| 2019/0379257 | A1 | 12/2019 | Gerstler et al. |
| 2019/0383220 | A1 | 12/2019 | Mackin |
| 2020/0003157 | A1 | 1/2020 | Clements et al. |
| 2020/0025304 | A1 | 1/2020 | Minta et al. |
| 2020/0108937 | A1 | 4/2020 | Behrens et al. |
| 2020/0141326 | A1 | 5/2020 | Redford et al. |
| 2020/0141327 | A1 | 5/2020 | Redford et al. |
| 2020/0141654 | A1 | 5/2020 | Ranjan |
| 2020/0182162 | A1 | 6/2020 | Burge |
| 2020/0217249 | A1 | 7/2020 | Djelassi |
| 2020/0291871 | A1 | 9/2020 | Bulat et al. |
| 2020/0300115 | A1 | 9/2020 | Aurahs et al. |
| 2021/0001990 | A1 | 1/2021 | Garcia Zuazo et al. |
| 2022/0372885 | A1 | 11/2022 | Berdowski et al. |
| 2023/0044006 | A1 | 2/2023 | Lemonnier et al. |
| 2023/0146084 | A1 | 5/2023 | Sharma et al. |
| 2023/0147089 | A1 | 5/2023 | Berdowski et al. |

FIG. –2–

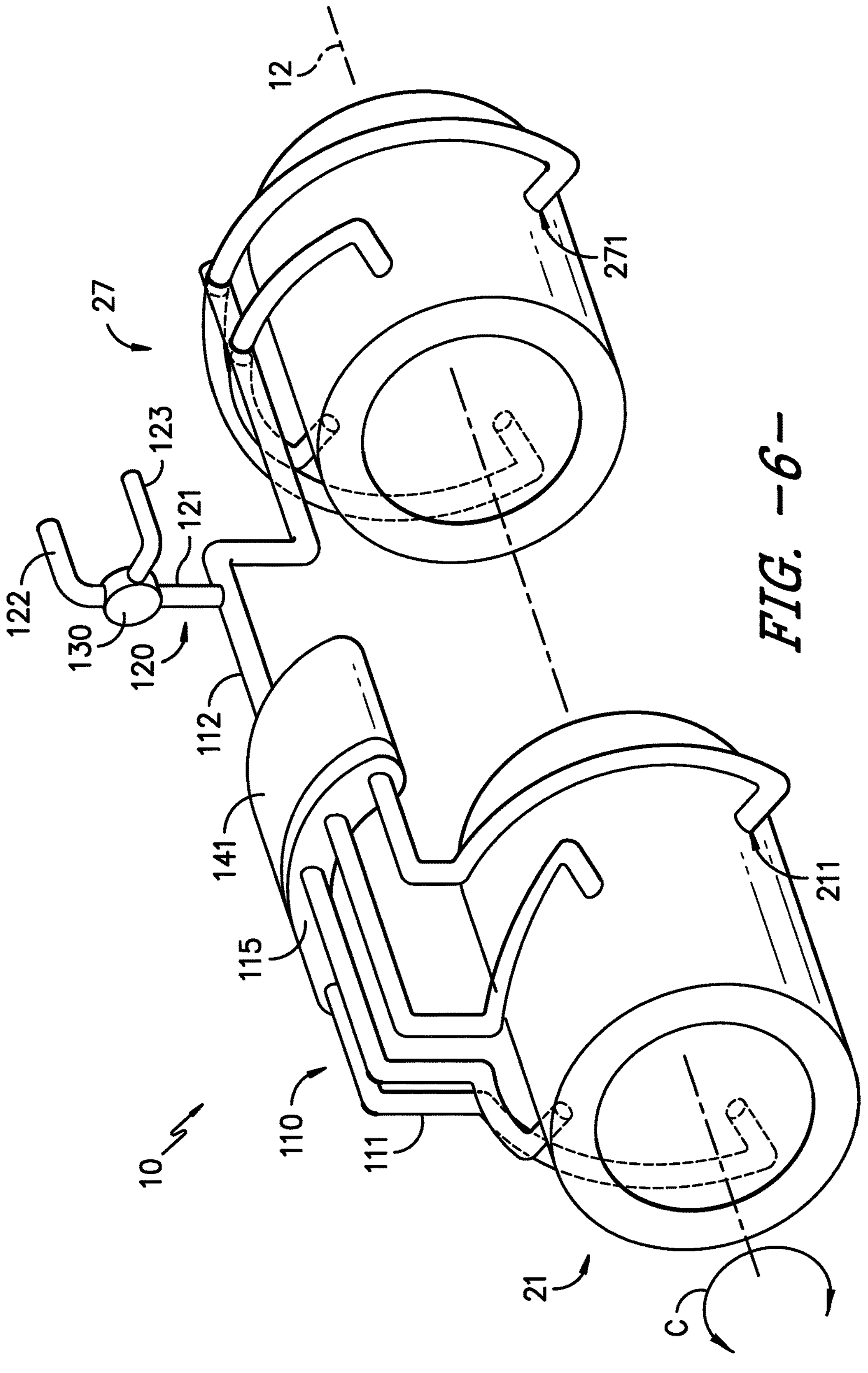
FIG. –6–

FIG. –16–

GAS TURBINE ENGINE WITH A FLUID CONDUIT SYSTEM AND A METHOD OF OPERATING THE SAME

CROSS-REFERENCE TO RELATED APPLICATIONS

This application claims priority to Polish Patent Application No. P.439448, filed Nov. 5, 2021, which is a non-provisional application, and wherein the above application is hereby incorporated by reference in its entirety. This application is also a divisional application of U.S. patent application Ser. No. 17/561,203 filed Dec. 23, 2021, the contents of which are hereby incorporated by reference in its entirety.

GOVERNMENT SPONSORED RESEARCH

The project leading to this application has received funding from the European Union Clean Sky 2 research and innovation program under grant agreement No. CS2-ENG-GAM-2014-2015-01.

FIELD

The present subject matter relates particularly to fluid conduits for gas turbine engines, such as for clearance control structures of turbine sections of gas turbine engines.

BACKGROUND

Casings for gas turbine engines, such as turbine section casings surrounding turbine section rotors, generally require separable flanges and assembled casing and manifold portions due to internally and externally mounted components. Such components generally include brackets or hangers for turbine shrouds, or flanges for multiple casings. Additionally, since turbine casings surround turbine rotors, excessive deformation, thermal expansion or contraction, or bowing may result in excessive rub and undesired contact with the turbine rotors, which can result in loss in performance or operability. Certain casings may include assemblies via separable flanges to limit deformation or displacement during engine operation and thermal cycling. However, the inventors of the present disclosure have found that such designs require assembly and parts that add weight to the engine. Moreover, the inventors of the present disclosure have found that such designs may further inhibit the inclusion or placement of thermal control structures for more effective clearance control.

As such, the inventors of the present disclosure have found that there is a need for turbine casings that can overcome these limitations and provide improved thermal control, improved engine efficiency, and reduced weight.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 is a perspective view of a portion of an embodiment of the gas turbine engine in accordance with aspects of the present disclosure;

Figure 1:
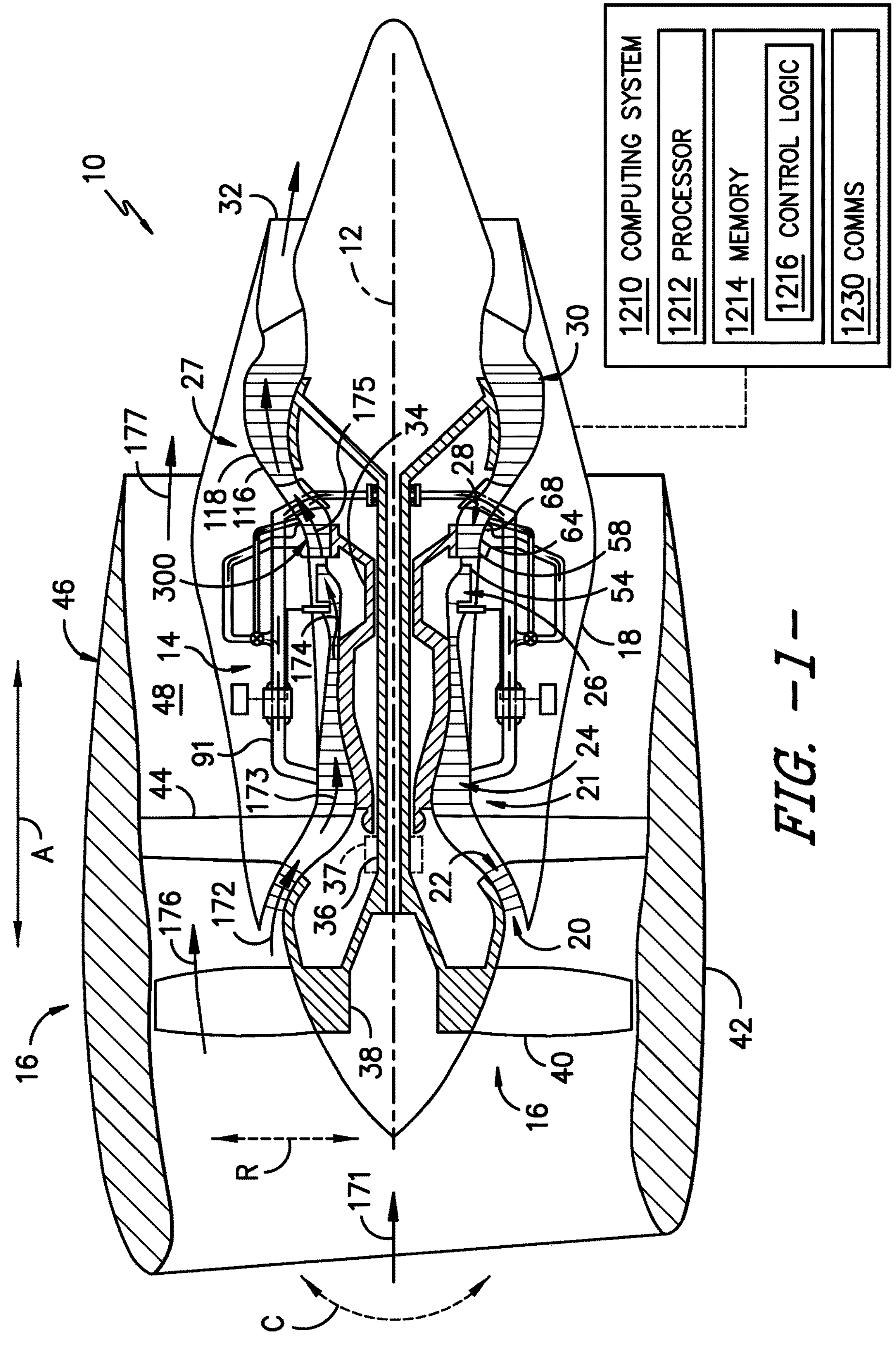
FIG. 1 is an exemplary schematic cross sectional view of an embodiment of a gas turbine engine in accordance with aspects of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The singular forms “a”, “an”, and “the” include plural references unless the context clearly dictates otherwise.

The terms “coupled,” “fixed,” “attached to,” and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as “about”, “approximately”, and “substantially”, are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Pressure values, and ranges thereof, are in absolute pressure measurement (psia) or equivalent. Values and ranges of pressure provided herein may be converted to ranges in gauge pressure, or other pressure units, or other units, measurements, or combinations thereof that correspond to the values and/or ranges disclosed herein.

The term “overall power output” refers to a maximum rated power output of an engine.

The term “operating envelope” refers to a cycle, mission, or set of maneuvers at which the engine may normally operate. In one embodiment, a landing-takeoff (LTO) cycle may define an operating envelope. The LTO cycle including one or more combinations of startup, idle, takeoff, cruise, and approach engine operating conditions may collectively define the operating envelope. In various embodiments, the cruise condition defines a majority of the operating envelope, such as to define a majority of an operating time or duration of the engine operation. In certain embodiments, the cruise condition is between approximately 55% and 75% of the operating envelope. Stated differently, the cruise condition may define approximately 55% to approximately 75% of the duration of engine operation from startup to shutdown following approach operating condition. In another embodiment, the cruise condition may define approximately 60% to approximately 70% of the duration of engine operation.

The term “cruise operating condition” may further refer to mid-power engine operating condition. The term “takeoff operating condition” may refer to a full power condition and “idle operating condition” may refer to a low power condition, and “cruise operating condition” is a power or thrust condition therebetween. In some embodiments, the cruise condition corresponds to approximately 75% to approximately 90% of an overall power output of the engine. In still certain embodiments, the cruise condition corresponds to approximately 80% to 88% of the overall power output of the engine.

A “third stream” as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term “turbomachine” or “turbomachinery” refers to a machine including one or more compressors, a heat generating section (e.g., a combustion section), and one or more turbines that together generate a torque output.

The term “gas turbine engine” refers to an engine having a turbomachine as all or a portion of its power source. Example gas turbine engines include turbofan engines, turboprop engines, turbojet engines, turboshaft engines, etc.

The term “combustion section” refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms “low” and “high”, or their respective comparative degrees (e.g., -er, where applicable), when used with a compressor, a turbine, a shaft, or spool components, etc. each refer to relative speeds within an engine unless otherwise specified. For example, a “low turbine” or “low speed turbine” defines a component configured to operate at a rotational speed, such as a maximum allowable rotational speed, lower than a "high turbine" or "high speed turbine" at the engine.

The term "at," as used herein to refer to a location of a first object relative to a second object (e.g., the first object located or positioned at the second object) refers to the first object being positioned wholly or partially within the second object, the first object contacting the second object, or the first object being positioned closest to the second object (relative to any other surrounding relevant components).

One or more components of the turbomachine engine described herein below may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

Suitable powder materials for the manufacture of the structures provided herein as integral, unitary, structures include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

Embodiments of a gas turbine engine including an improved clearance control system are provided. The engine reduces weight and tubes, manifolds, or conduits outside of an outer core casing or fan casing by reducing or eliminating air extracted from a fan bypass passage for cooling at a turbine section. Embodiments provided herein allow for engines without fan casings, such as open rotor engines or propfan engines, to have and operate improved clearance control, cooling systems, or air systems for turbine sections and/or bearing assemblies. It should be appreciated that while such embodiments may be applied to turbofan engines including nacelles and fan casings, embodiments provided herein allow for engines without nacelles, fan casings, or other structures surrounding the fan section to receive air for turbine section cooling, clearance control, or bearing assemblies.

The improved gas turbine engine provided herein may additionally, or alternatively, allow for lower-pressure and/or lower-temperature air to be removed from the compressor section for cooling or clearance control at the turbine section and bearing assembly. Certain clearance control systems may generally utilize high-energy air (i.e., high-pressure and/or high-temperature air), such as from aft stages of a high pressure compressor, and mix with one or more other sources of air, such as from other compressor stages or from the fan air stream. Such high-energy air reduces engine efficiency, such as by removing energy from the thermodynamic and combustion process, or by requiring greater reduction in heat load before the air is appropriate for cooling or clearance control at the turbine section. Still further, certain clearance control systems may not be suitable for additionally providing air to a bearing assembly for cooling, buffer air, or other uses at the bearing assembly.

Another aspect of the disclosure is directed to an improved turbine casing allowing for improved clearance control, cooling fluid distribution, reduced weight, and improved engine efficiency. Embodiments of an engine, casing, and manifold provided herein include integral, unitary structures such as may be formed by additive manufacturing processes that would not have heretofore been possible or practicable. Embodiments depicted and described herein allow for improved and advantageous positioning of thermal control rings for improved clearance control response, improved formation and positioning of openings, passages, and conduits to allow for more efficient heat transfer fluid utilization and movement, and reduced weight, such as via obviating flanges and sub-assemblies into integral components. Particular combinations of these features allow for improved heat transfer properties and reduced thermal gradients. Improved heat transfer properties particularly include a lower heat transfer coefficient at certain features, such as at the plurality of walls that form thermal control rings as provided herein. Such improvements may mitigate or eliminate undesired or excessive deformation, ovalization, bowing, or other changes in casing geometry that may adversely affect deflections or result in undesired contact to the turbine rotors.

Embodiments provided herein include, e.g., an integral, unitary high speed turbine casing and turbine center frame or mid-turbine frame positioned downstream of the high speed turbine and upstream of a low- or intermediate-pressure turbine. Embodiments provided herein further include, e.g., an integral, unitary clearance control manifold configured to provide heat transfer fluid to thermal control rings. The integral, unitary structures may further allow for improved positioning of the thermal control rings relative to the turbine rotors, such as to provide improved clearance control across the turbine rotor assembly.

As used herein, the term "integral, unitary" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

Referring now to the drawings, FIG. 1 is a schematic cross-sectional view of an exemplary gas turbine engine 10 herein referred to as "engine 10" as may incorporate various embodiments of the present disclosure. Particular embodiments of the engine 10 may be configured as a turbofan, turboprop, turboshaft, or propfan gas turbine engine, or one or more gas turbine engines configured as hybrid-electric gas turbine engines, or other gas turbine engine configuration.

As shown in FIG. 1, the engine 10 has a longitudinal or axial centerline axis 12 that extends therethrough for reference purposes. In general, the engine 10 may include a turbomachine 14 disposed downstream from a fan section 16.

The engine 10 includes a compressor section 21 in serial flow arrangement with a turbine section 27. The turbomachine 14 may generally include a substantially tubular outer casing 18 that defines an annular inlet 20. The outer casing 18 may be formed from multiple casings. The outer casing 18 encases, in serial flow arrangement, the compressor section 21, a combustion section 26, and the turbine section 27. In a particular embodiment, the compressor section 21 includes a booster or low speed compressor 22 and a high speed compressor 24. In a still particular embodiment, the turbine section 27 includes a first turbine assembly or high speed turbine 28 and a second turbine assembly or low speed turbine 30 (e.g., including vanes 116 and rotor blades 118). A jet exhaust nozzle section 32 is positioned downstream of the turbine section 27. A high speed shaft or spool 34 drivingly connects the high speed turbine 28 to the high speed compressor 24. A low speed shaft or spool 36 drivingly connects the low speed turbine 30 to the low speed compressor 22. The low speed spool 36 may also be connected to a fan shaft or spool 38 of the fan section 16. In particular embodiments, the low speed spool 36 may be connected directly to the fan spool 38 such as in a direct-drive configuration. In alternative configurations, as is depicted in phantom in FIG. 1, the low speed spool 36 may be connected to the fan spool 38 via a gear assembly 37, such as to configure the engine 10 as an indirect-drive or geared-drive configuration allowing for a higher or lower rotational speed of the fan spool 38 versus the low speed spool 36. Such gear assemblies may be included between any suitable shafts/spools within engine 10 as desired or required.

Although depicted and described as a two-spool engine including the high speed spool 34 separately rotatable from the low speed spool 36, it should be appreciated that the engine 10 may be configured as a three-spool engine including the high speed spool 34, the low speed spool 36, and a third spool or intermediate speed spool positioned in serial flow arrangement between the high speed spool 34 and the low speed spool 36. Accordingly, the compressor section 21 may include an intermediate speed compressor separately rotatable from the high speed compressor 24 and the low speed compressor 22. Similarly, the turbine section 27 may include a third turbine assembly or an intermediate speed turbine separately rotatable from the high speed turbine 28 and the low speed turbine 30. The intermediate speed compressor and the intermediate speed turbine may together be coupled to form an intermediate speed spool fluidly between the high speed spool and the low speed spool.

It should further be appreciated that in certain embodiments the low speed turbine 30 or second turbine assembly described herein generally refers to a separately rotatable spool downstream of the high speed turbine or first turbine assembly. As such, the second turbine assembly may include an intermediate speed turbine or a low speed turbine positioned aft or downstream of the high speed turbine.

As shown in FIG. 1, the fan section 16 includes one or more axially-spaced stages of a plurality of fan blades 40 that are coupled to and that extend radially outwardly from the fan spool 38. An annular fan casing or nacelle 42 circumferentially surrounds the fan section 16 and/or at least a portion of the turbomachine 14. It should be appreciated that for the embodiment depicted the nacelle 42 is supported relative to the turbomachine 14 by a plurality of circumferentially-spaced outlet guide vanes 44.

A bypass airflow passage 48 is formed downstream of one or more stages of the plurality of fan blades 40 and around an outer portion of the turbomachine 14. In a particular embodiment, such as depicted in FIG. 1, the bypass airflow passage 48 is defined at a downstream section 46 of the nacelle 42 (downstream of the outlet guide vanes 44) and between the nacelle 42 and the outer portion of the turbomachine 14.

Figure 3:
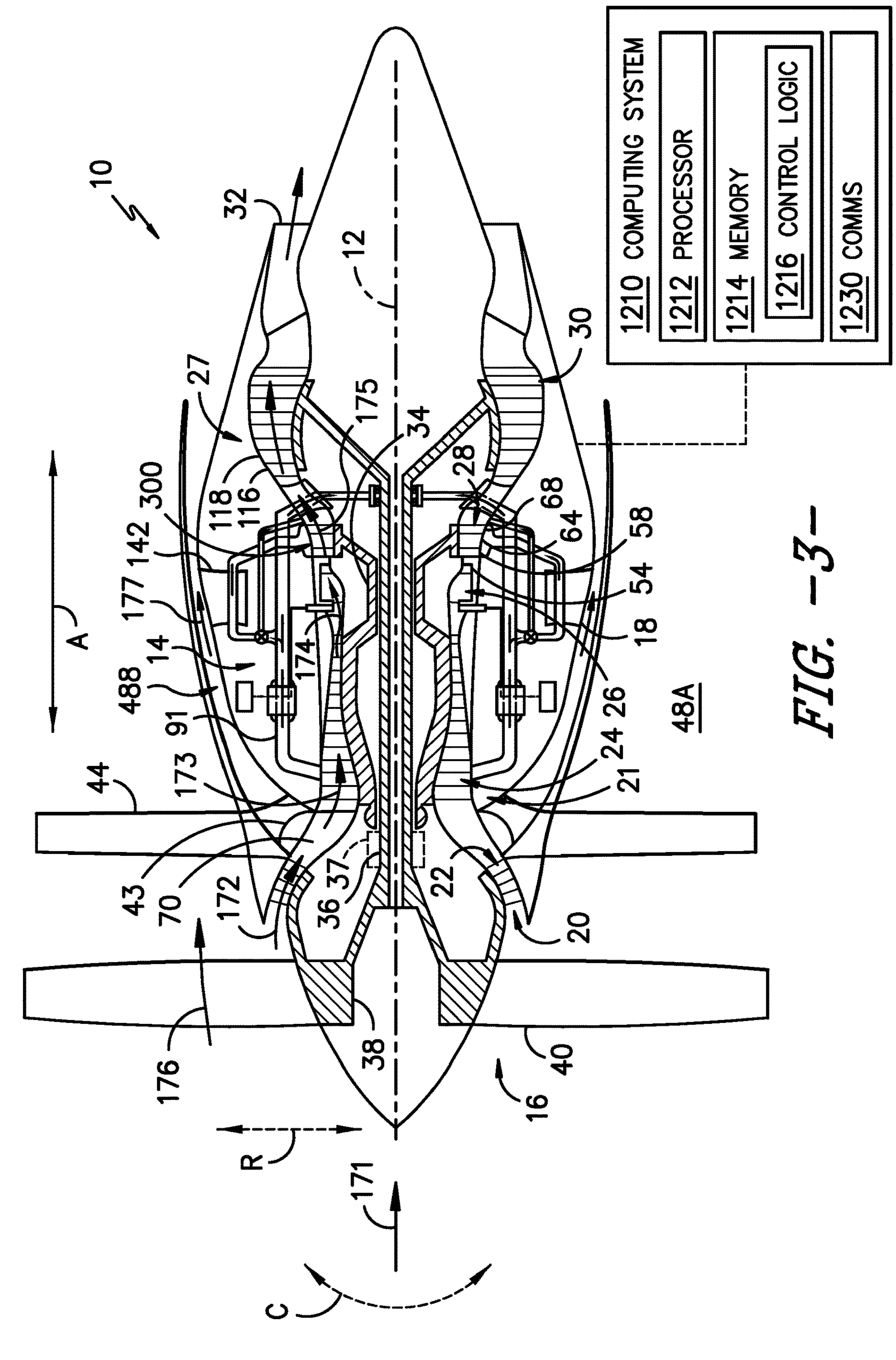
FIG. 3 is an exemplary schematic cross sectional view of an embodiment of a gas turbine engine in accordance with aspects of the present disclosure.

However, in other embodiments, it should be appreciated that the low speed compressor 22 may form one or more stages of the fan section 16, such as depicted in FIG. 3. As such, the bypass airflow passage 48 may generally include any flowpath downstream of one or more stages of the plurality of fan blades 40 or the low speed compressor 22 and bypassing or surrounding at least a portion of the high speed compressor 24, and having a flow of bypass air 177 therethrough provide thrust. Accordingly, certain embodiments of the engine 10 provided herein may be configured as a third stream or adaptive cycle engine having a plurality of bypass airflow passages 48 downstream of one or more stages of the plurality of fan blades and/or the low speed compressor 22 and upstream of at least a portion of the high speed compressor 24, with one or more of which configured as a "third stream."

The engine 10 includes a computing system 1210 configured to perform operations. The computing system 1210 is communicatively coupled to the turbomachine 14 and/or a starter motor (not depicted) to adjust, modulate, maintain, change, or articulate any one or more control surfaces to generate the flows of air, one or more embodiments of the flow of heat transfer fluid, and/or a liquid and/or gaseous fuel in accordance with aspects of the present disclosure provided herein. The computing system 1210 can generally correspond to any suitable processor-based device, including one or more computing devices. Certain embodiments of the computing system 1210 include a full authority digital engine controller (FADEC), a digital engine controller (DEC), or other appropriate computing device configured to operate the engine 10.

The computing system 1210 may include one or more processors 1212 and one or more associated memory devices 1214 configured to perform a variety of computer-implemented functions, such as steps of the methods described herein. As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 1214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD), non-transitory computer-readable media, and/or other suitable memory elements or combinations thereof.

The computing system 1210 may include control logic 1216 stored in the memory 1214. The control logic 1216 may include computer-readable instructions that, when executed by the one or more processors 1212, cause the one or more processors 1212 to perform operations, such as outlined in one or more steps of the method 1000 provided further below. In still various embodiments, the memory 1214 may store charts, tables, functions, look ups, schedules etc. corresponding to the flows, or rates, pressures, or temperatures associated with the flows of air, heat transfer fluid, or fuel provided herein. The instructions can be software written in any suitable programming language or can be implemented in hardware. Additionally, and/or alternatively, the instructions can be executed in logically and/or virtually separate threads on the processor(s).

The computing system 1210 may also include a communications interface module 1230. In various embodiments, the communications interface module 1230 can include associated electronic circuitry that is used to send and receive data. As such, the communications interface module 1230 of the computing system 1210 can be used to receive data from one or more control surfaces, sensors, measurement devices, or instrumentation, or calculations or measurements corresponding to one or more portions of the engine 10 provided herein, and may execute one or more steps of the method 1000 provided herein. The computing system(s) 1210 can also include a network interface used to communicate, for example, with the other components of engine 10. The network interface can include any suitable components for interfacing with one or more network(s), including for example, transmitters, receivers, ports, controllers, antennas, and/or other suitable components.

It should be appreciated that the communications interface module 1230 can be any combination of suitable wired and/or wireless communications interfaces and, thus, can be communicatively coupled to one or more components of the apparatus via a wired and/or wireless connection. As such, the computing system 1210 may obtain, determine, store, generate, transmit, or operate any one or more steps of the method described herein via a distributed network. For instance, the network can include a SATCOM network, ACARS network, ARINC network, SITA network, AVICOM network, a VHF network, a HF network, a Wi-Fi network, a WiMAX network, a gatelink network, etc.

Figure 2:
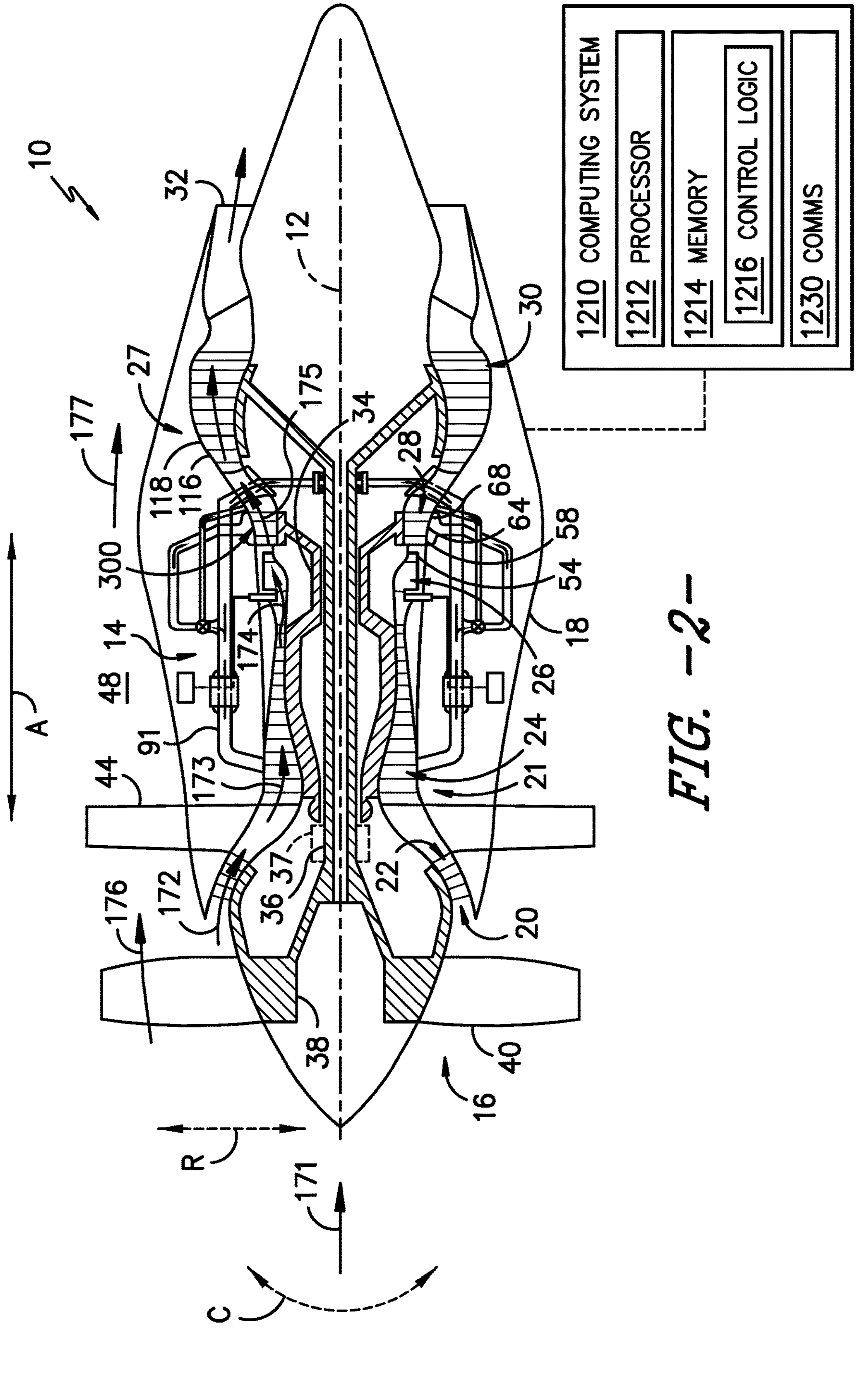
FIG. 2 is an exemplary schematic cross sectional view of an embodiment of a gas turbine engine in accordance with aspects of the present disclosure.

Referring now to FIG. 2, an exemplary embodiment of an open rotor configuration of the engine 10 depicted and described with regard to FIG. 1 is provided. The embodiment of the engine 10 provided in FIG. 2 is configured substantially similarly as provided in FIG. 1. However, in FIG. 2, the open rotor configuration of the engine 10 does not have a fan casing or the nacelle 42 (depicted in FIG. 1) surrounding the plurality of fan blades 40. The bypass airflow passage 48 is formed downstream of the plurality of fan blades 40, or particularly downstream of the outlet guide vanes 44, and radially outward of the outer portion of the turbomachine 14.

Referring now to FIG. 3, an exemplary embodiment of an open rotor configuration in accordance with FIG. 2 is provided. The embodiment provided in FIG. 3 further includes a plurality of bypass airflow passages 48 formed downstream of the plurality of fan blades 40, such as described above. In the particular embodiment depicted, the engine 10 includes a first bypass airflow passage 48A and a second bypass airflow passage 48B. The second bypass airflow passage 48B is extended from a location between the low speed compressor 22 and the high speed compressor 24 to an exhaust to atmosphere (although in other embodiments the second bypass airflow passage 48B may extend to the first bypass airflow passage 48A). An articulating vane or door structure 43 may be positioned at the second bypass airflow passage 48B. The door structure 43 may include any appropriate type of actuatable wall, vane, door, or other structure configured to desirably alter a flow of air 172 received from a core gas flowpath 70 and allowed through the second bypass airflow passage 48B, such as depicted schematically via arrows 177. The second bypass airflow passage 48B may be referred to as a third stream.

Although FIG. 3 depicts the engine 10 having a three-stream or adaptive cycle with an open rotor configuration, it should be appreciated that the adaptive cycle configuration may also include a nacelle surrounding the fan section, such as depicted and described with regard to FIG. 1. In such a manner, it should further be appreciated that although certain advantages and benefits provided herein may provide benefits for turbofan engines having nacelles, embodiments and arrangements of the components provided herein may overcome issues or challenges that are particular to open rotor configurations.

Figure 4:
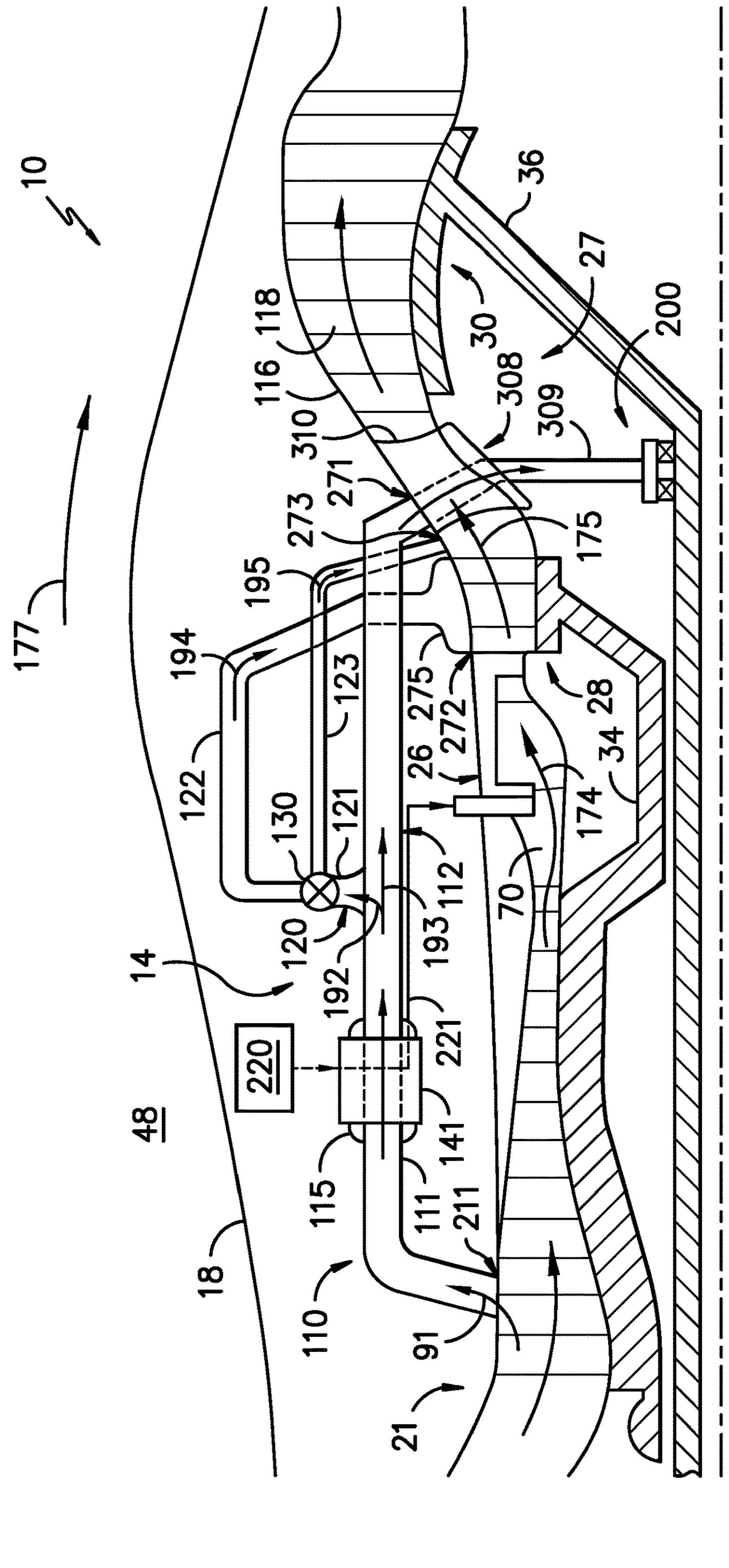
FIG. 4 is a schematic cross-sectional view of a portion of an embodiment of a gas turbine engine in accordance with aspects of the present disclosure.
Figure 5:
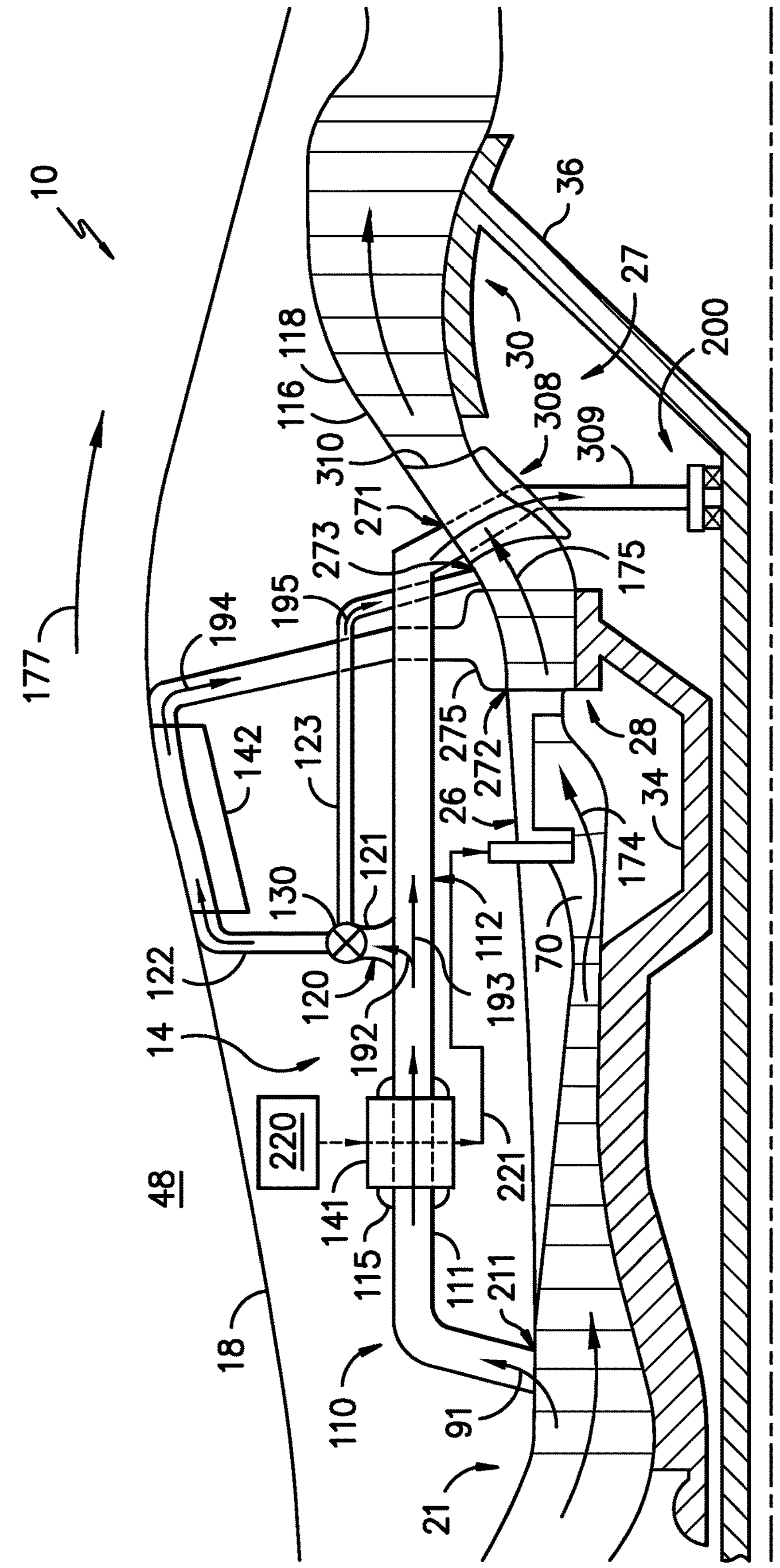
FIG. 5 is a schematic cross-sectional view of a portion of an embodiment of a gas turbine engine in accordance with additional aspects of the present disclosure.

Referring now to FIGS. 4-5, enlarged cross-sectioned views of an engine 10 configured in a similar manner as one or more of the exemplary engines 10 depicted in FIGS. 1-3 are provided. FIGS. 4-5 depict walled conduits, manifolds, tubes, or other structures forming flowpaths configured to extract or receive a flow of air, depicted schematically via arrows 91, from the compressor section 21 and provide the flow of air 91 to the turbine section 27. The flow of air 91 provided to the turbine section 27 may be utilized for cooling blades, vanes, shrouds, or other portions of the turbine section 27. In certain embodiments, the turbine section 27 includes a turbine frame 308 positioned in serial flow arrangement between the first turbine assembly or the high speed turbine 28 and the second turbine assembly or low speed turbine 30. In still particular embodiments, a bearing assembly 200 is included at the turbine frame 308. Accordingly, the turbine frame 308 may provide a static mount or support structure at which the bearing assembly 200 is positioned to support rotation of one or more spools (e.g., low speed spool 36 or high speed spool 34). The turbine frame 308 further includes any appropriate quantity of conduits, manifolds, or passages 309, or other structures for allowing at least a portion of the flow of air 91 (e.g., depicted further below as flow of air 193) to the bearing assembly 200. The flow of air to the bearing assembly 200 may provide cooling or buffer air at the bearing assembly 200, such as to attenuate vibrations from the spool or generate desired bearing or rotor clearances. In other embodiments, the flow of air 91 is provided to the gear assembly 37 positioned at the fan section 16, to the compressor section 21, to the turbine section 27, or to the jet exhaust nozzle section 32.

The engine 10 includes a first conduit 110 extended in fluid communication from the compressor section 21 to the turbine section 27. The first conduit 110 is configured to communicate the flow of air 91 from the compressor section 21 to a first location 271 at the turbine section 27. The first conduit 110 forms a flow passage separate from the core gas flowpath 70. In a particular embodiment, the first conduit 110 provides the flow of air 91 from the compressor section 21 to the turbine section 27 while bypassing the combustion section 26.

A first heat exchanger 141 is positioned in thermal communication with the flow of air 91 through the first conduit 110. The first heat exchanger 141 is configured to receive heat or thermal energy from the flow of air 91 through the first conduit 110. Accordingly, the first heat exchanger 141 is configured to cool the flow of air 91 through the first conduit 110 before the flow of air 91 is provided to the turbine section 27. The first heat exchanger 141 is configured as any appropriate heat exchanger for extracting heat or thermal energy from the flow of air 91 and receiving or transmitting heat or thermal energy to a heat transfer fluid, depicted schematically via arrows 221. Particular embodiments of the engine 10 may include a fluid system 220 configured to flow the heat transfer fluid 221 as a lubricant, a liquid and/or gaseous fuel, a hydraulic fluid, a supercritical fluid, a refrigerant, or an appropriately cooler air or inert gas. The fluid system 220 provides the heat transfer fluid 221 into thermal communication with the flow of air 91 via the first heat exchanger 141. In a particular embodiment depicted in FIG. 9 (discussed in more detail below), the heat transfer fluid 221 is a liquid fuel provided to the combustion section 26. However, it should be appreciated that the heat transfer fluid 221 may be provided and utilized in any appropriate way, including, but not limited to, as a lubricant for a bearing system, an anti-icing fluid, fuel, or actuation fluid.

Referring still to FIGS. 4-5, the engine 10 includes a second conduit 120 extended from the first conduit 110 downstream of the first heat exchanger 141 (relative to the flow of air 91 from the compressor section 21 to the turbine section 27). The second conduit 120 is extended in fluid communication to a second location 272 at the turbine section 27. A flow control device 130 is positioned at the second conduit 120. The flow control device 130 is configured to selectively adjust, alter, modulate, or otherwise change an amount of the flow of air 91 from the first conduit 110 through the second conduit 120.

In various embodiments, the second conduit 120 includes an inlet portion 121 and an outlet portion 122. The inlet portion 121 is fluidly coupled to the first conduit 110 and the flow control device 130. The inlet portion 121 extends from the first conduit 110 to provide a portion of the flow of air 91, depicted schematically via arrows 192, to the flow control device 130. The outlet portion 122 is fluidly coupled to the flow control device 130 and the second location 272 of the turbine section 27. The outlet portion 122 extends from the flow control device 130 to provide at least a portion of the flow of air 192 to the second location 272 at the turbine section 27. In such a manner, it will be appreciated that for the embodiment depicted, the flow control device 130 is positioned between the inlet and outlet portions 121, 122 of the second conduit 120.

The flow control device 130 may be a valve or any appropriate device for regulating, directing, controlling, or otherwise modulating an amount of flow of fluid across a passage or flowpath. The flow control device 130 may include an actuated valve or an automatic valve driven by an electric energy source, a pneumatic energy source (e.g., air, or particularly, at least a portion of the flow of air 91), or a fluid source (e.g., liquid and/or gaseous fuel, hydraulic fluid, lubricant, or combinations thereof). The flow control device 130 may include ball valves, shuttle valves, or other appropriate type of valve or flow regulating device in accordance with the embodiments depicted and described herein. Accordingly, the flow control device 130 is configured to modulate the amount of flow of fluid through the outlet portion 122 of the second conduit 120, such as depicted schematically via arrows 94.

In a particular embodiment, the engine 10 includes a third conduit 123 extending from the flow control device 130 to a third location 273 at the turbine section 27, in fluid communication with both the flow control device 130 and the third location 273. The flow control device 130 may therefore be a three-way valve configured to selectively change the amount of the flow of air 91 from the first conduit 110 through the inlet portion 121 of the second conduit 120 to one or both of the third conduit 123 and the outlet portion 122 of the second conduit 120. Accordingly, the flow control device 130 may be configured to modulate an amount of the flow of air 192 through the outlet portion 122 of the second conduit 120, such as depicted schematically via arrows 194, and furthermore modulate and egress of at least a portion of the flow of air 192 through the third conduit 123, such as depicted schematically via arrows 195. The third conduit 123 may form a bypass passage to further allow for selective adjustment, control, or modulation of the flows of air through the flow control device 130. In a particular embodiment, the third conduit 123 allows for a portion of the air extracted from the first conduit 110 to bypass the outlet portion 122 of the second conduit 120 and egress to the third location 273 at the turbine section 27. In certain embodiments, the third location 273 allows for bypassing a clearance control system 275 (described below) and allowing the flow of air 195 to enter the turbine section 27 at the core gas flowpath 70 downstream of the clearance control system 275, or to mix with the flow of air 193 at the turbine frame 308, or to vent to ambient (not depicted).

Referring still to FIGS. 4-5, as briefly noted above, the turbine section 27 includes the clearance control system 275. Exemplary embodiments of improved clearance control systems are depicted in FIGS. 8-16, including a casing 300, manifold assemblies 316, and thermal control rings 314 such as provided therein. However, it should be appreciated that the clearance control system 275 depicted in FIGS. 4-5 may include any appropriate structure or assembly for controlling, adjusting, or otherwise modulating a dimension between a rotor blade tip and a surrounding shroud or wall at the turbine section 27, otherwise referred to as tip clearance. The clearance control system 275 may be an active clearance control (ACC) system configured to dynamically control tip clearance. Particularly, the ACC system may be configured to desirably modulate the tip clearance based on an engine operating condition via the flow of air 94 received from the second conduit 120 and provided to a surrounding shroud at the turbine section 27. The volumetric or mass flow rate of the flow of air 94 is regulated or modulated by the flow control device 130. Modulating the amount of the flow of air 94 to the clearance control system 275 allows the tip clearance to be desirably regulated across various engine operating conditions and associated changes in temperature at the turbine section 27. As temperatures and rotor speeds change at the turbine section 27 across various engine operating conditions, the flow control device 130 modulates the amount of the flow of air 94 provided to clearance control system 275 to maintain or provide a desired tip clearance. With regard to a landing-takeoff cycle (LTO) of the engine 10 and an aircraft, engine operating conditions include startup, idle, takeoff, climb, cruise, approach, or reverse thrust. However, it should be appreciated that other engine operating conditions and cycles may be applicable.

Referring still to FIGS. 4-5, the second location 272 at the turbine section 27 is at the clearance control system 275. Accordingly, the second conduit 120, or particularly the outlet portion 122 of the second conduit 120, is fluidly coupled to the turbine section 27 to provide the flow of air

94 to the clearance control system 275 such as described herein. In a particular embodiment, the clearance control system 275 is operably coupled to a first turbine assembly or the high speed turbine 28 at the turbine section 27. Accordingly, the engine 10 is configured to receive the flow of air 91 from the compressor section 21 and provide the portion of the flow of air 94 (from the flow of air 91) to the clearance control system 275 at the high speed turbine 28 via the second conduit 120.

In still particular embodiments, the first conduit 110 is fluidly coupled to the turbine frame 308 positioned between the first turbine assembly, or the high speed turbine 28, and a second turbine assembly, or low speed turbine 30. The turbine frame 308 may include a plurality of vanes 310 in circumferential arrangement and positioned between the turbines 28, 30. The first location 271 at the turbine section 27 is at the turbine frame 308. Accordingly, in such embodiments, the first conduit 110 is configured to provide at least a portion of the flow of air 91 to the turbine frame 308 at the first location 271. In a particular embodiment, schematic arrows 193 depict a portion of the flow of air at the first conduit 110 downstream of a juncture with the second conduit 120. The flow of air 193 is provided to the turbine frame 308 via the first conduit 110. In particular embodiments further depicted and described with regard to FIGS. 8-16, the flow of air 193 may be provided to the casing 300 and through the plurality of vanes 310 at the turbine frame 308, such as depicted schematically via arrows 99.

Referring to FIGS. 4-5, the turbine frame 308 may include or form one or more passages 309 configured to provide fluid communication of the flow of air 193 to the bearing assembly 200. The flow of air 193 may provide a buffer fluid for operation of the bearing assembly 200. The buffer fluid may desirably control or attenuate vibrations, or allow or generate desired clearances or vibratory responses at the bearing assembly 200 or the rotors to which the bearing assembly is coupled.

Referring now specifically to FIG. 5, in a particular embodiment, the engine 10 includes a second heat exchanger 142 in thermal communication with a flow of air at the bypass airflow passage 48. The second heat exchanger 142 may be configured as a surface heat exchanger configured to receive heat or thermal energy from the flow of air 194 downstream of the flow control device 130 at the second conduit 120. The heat transfer fluid at the second heat exchanger 142 is a flow of air through the bypass airflow passage 48 of the engine 10, such as depicted schematically via arrows 177. The second heat exchanger 142 configured as a surface heat exchanger has a heat exchange surface at the bypass airflow passage 48 and is configured to place the flow of air 194 at the second conduit 120 in thermal communication with the flow of bypass air 177 at the bypass airflow passage 48. In a particular embodiment, the second heat exchanger 142 is positioned at the outlet portion 122 of the second conduit 120 and upstream of the second location 272 at the turbine section 27.

Referring back generally to both FIGS. 4-5, in a particular embodiment, the first conduit 110 includes an inlet manifold 111 configured to receive the flow of air 91 from a circumferential compressor location 211 at the compressor section 21. It should be appreciated that although the embodiments depicted in FIGS. 4-5 depict a single circumferential compressor location 211, the inlet manifold may be configured to receive the flow of air 91 from a plurality of circumferential compressor locations 211.

Referring now to FIG. 6, a perspective view of an embodiment of a portion of an engine 10 in accordance with one or more of FIGS. 1 through 3 is provided. The embodiment provided in FIG. 6 may be configured substantially similarly as described in regard to the embodiments in FIGS. 4-5. In FIG. 6, the engine 10 may include a plurality of inlet manifolds 111 evenly-spaced or asymmetrically-spaced along the circumferential direction C around the compressor section 21. In various embodiments, the plurality of inlet manifolds 111 includes two (2) or more inlet manifolds. In one embodiment, the plurality of inlet manifolds 111 includes three (3) inlet manifolds. In another embodiment, the plurality of inlet manifolds 111 includes four (4) inlet manifolds and up to 30 inlet manifolds 111.

In FIG. 6, the first conduit 110 includes a collector 115 configured to receive the flow of air 91 from the inlet manifold 111. In particular embodiments, the plurality of inlet manifolds 111 is fluidly coupled to a single collector 115 to provide a collected or unified flow of air 91 to the first heat exchanger 141. The collector 115 may provide the flow of air 91 to the first heat exchanger 141, such as described herein.

In a still particular embodiment, the first conduit 110 includes an outlet manifold 112 configured to fluidly communicate the flow of air 91 from the first heat exchanger 141 to the turbine section 27 at the first turbine location 271 at the turbine section 27. The engine 10 may include a plurality of outlet manifolds 112 evenly-spaced or asymmetrically-spaced along the circumferential direction C around the turbine section 27. In various embodiments, the plurality of outlet manifolds 112 includes two (2) or more outlet manifolds. In one embodiment, the plurality of outlet manifolds 112 includes three (3) outlet manifolds. In another embodiment, the plurality of outlet manifolds 112 includes four (4) outlet manifolds and up to 30 outlet manifolds. In various embodiments, the second conduit 120 is extended in fluid communication from one or more of the plurality of outlet manifolds 112 of the first conduit 110. The plurality of outlet manifolds 112 may accordingly extend to a plurality of first turbine locations 271 at different circumferential positions at the turbine section 27.

It should be appreciated that although the embodiments depicted in FIGS. 4-5 depict a single circumferential first turbine location 271, the first turbine location 271 may include a plurality of circumferential first turbine locations 271.

Embodiments of the engine 10 provided in FIGS. 4-5 may include the first conduit 110 as a fixed area flowpath from the compressor section 21 to the turbine section 27. Stated differently, the first conduit 110 may include various cross-sectional areas or convergent and divergent flowpaths. However, the first conduit 110 and the circumferential compressor location 211 may define fixed or non-articulatable flowpath areas. Such fixed area flowpath allows for a constant volumetric or mass flow rate of the flow of air 91 from the compressor section 21 through the first conduit 110 with respect to a corresponding engine operating condition. Stated differently, the fixed area flowpath allows for the first conduit 110 to receive a corresponding flow rate of the flow of air 91 relative to the particular engine operating condition. Accordingly, embodiments of the engine 10 provided herein allow for constant flows of air 91 in thermal communication with the flow of heat transfer fluid 221 at the first heat exchanger 141. For instance, flow rates of the heat transfer fluid 221, such as a fuel flow rate or lubricant flow rate, may be controlled via a schedule, table, graph, or curve indicative of the flow rate versus the engine operating condition. In one embodiment, the flow of air 91 at the first conduit 110 may generally be fixed as a ratio or proportion of the overall flow of air entering the core engine inlet 20 into the compressor section 21. In another embodiment, the flow of air 91 at the first conduit 110 may generally be fixed as a ratio or proportion of the flow of air entering the high speed compressor 24 from the low speed compressor 22.

The engine 10 may particularly include a variable area flowpath at the second conduit 120 via the flow control device 130. Accordingly, the engine 10 may allow a fixed flow of air 193 to the turbine frame 308, such as for the bearing assembly 200, and a variable flow of air 194 to the clearance control system 275. The flow control device 130 may adjust, articulate, or otherwise modulate the flow of air 194 to the clearance control system 275 as a function of engine operating condition. Modulation of the flow of air 194 via the flow control device 130 may be a function of inlet air speed (into the turbomachine 14 via an inlet 20), or inlet air pressure (e.g., corresponding to altitude of the engine 10 during operation or at one or more engine operating conditions described above), or inlet air temperature, or combinations thereof. Modulation of the flow of air 194 via the flow control device 130 may additionally, or alternatively, be a function tip clearance at the turbine section 27, or a predetermined schedule corresponding to wear or deterioration at the turbine section 27.

Certain embodiments of the engine 10 include particular placements of the circumferential compressor location 211 at particular axial stages or other location at the compressor section 21 corresponding to particular pressure ranges of the flow of air 91 during operation of the engine 10. In various embodiments, the circumferential compressor location 211 from which the flow of air 91 is received from the core gas flowpath 70 corresponds to a compressor location having an airflow therethrough at a pressure between approximately 20 pounds per square inch (psi) and approximately 60 psi during an engine operating condition corresponding to between approximately 55% and approximately 75% of an operating envelope. In another embodiment, the circumferential compressor location 211 from which the flow of air 91 is received from the core gas flowpath 70 may corresponding to a compressor location having an airflow therethrough at a pressure between approximately 30 pounds per square inch (psi) and approximately 50 psi during the engine operating conditions such as described herein.

Accordingly, embodiments of the engine 10 provided herein allow for the clearance control system 275 and the bearing assembly 200 to operate and receive air from the compressor section 21. In certain embodiments, the engine 10 provided herein allows for the clearance control system 275 to receive the flow of 91 from the compressor section 21 rather than from the bypass airflow passage 48. Furthermore, or alternatively, the engine 10 provided herein allows for the flow of air 91 to be received from upstream, forward, or lower-pressure stages of the compressor section 21 in contrast to other compressor bleed systems that may receive high energy air from downstream, aft, or higher-pressure stages of a compressor section. Certain of these other compressor bleed systems may further mix the higher-energy air with lower-energy (i.e., lower pressure, lower temperature, or both) corresponding to the bypass airflow passage. Still further, or alternatively, embodiments of the engine 10 provided herein allow for a constant flow of air 91 through the first conduit 110 to maintain purge and backflow margin at the turbine frame 308 and bearing assembly 200.

Figure 7A:
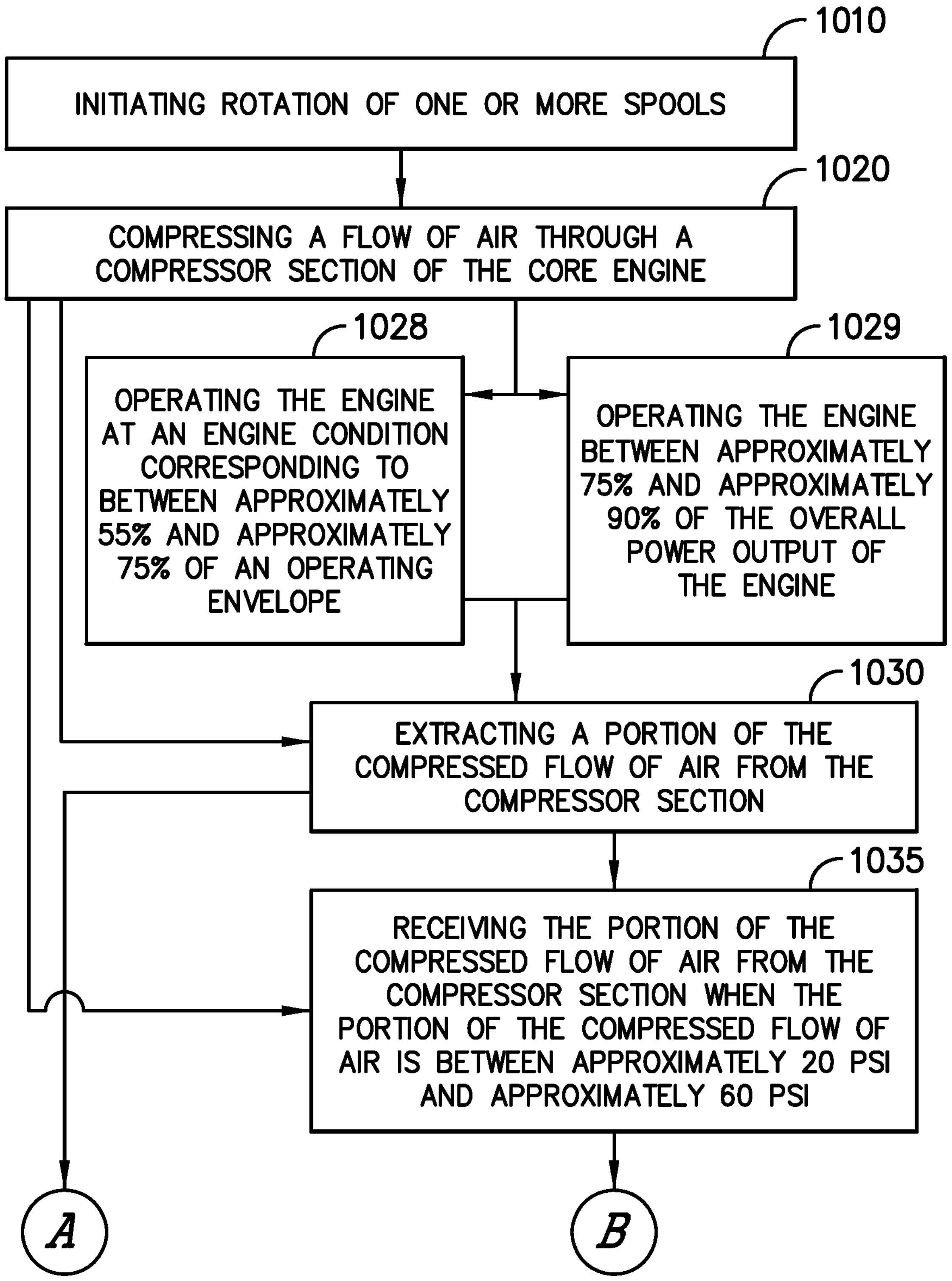
FIGS. 7A-7B depict flowcharts outlining steps of a method for operating an engine in accordance with aspects of the present disclosure.
Figure 7B:
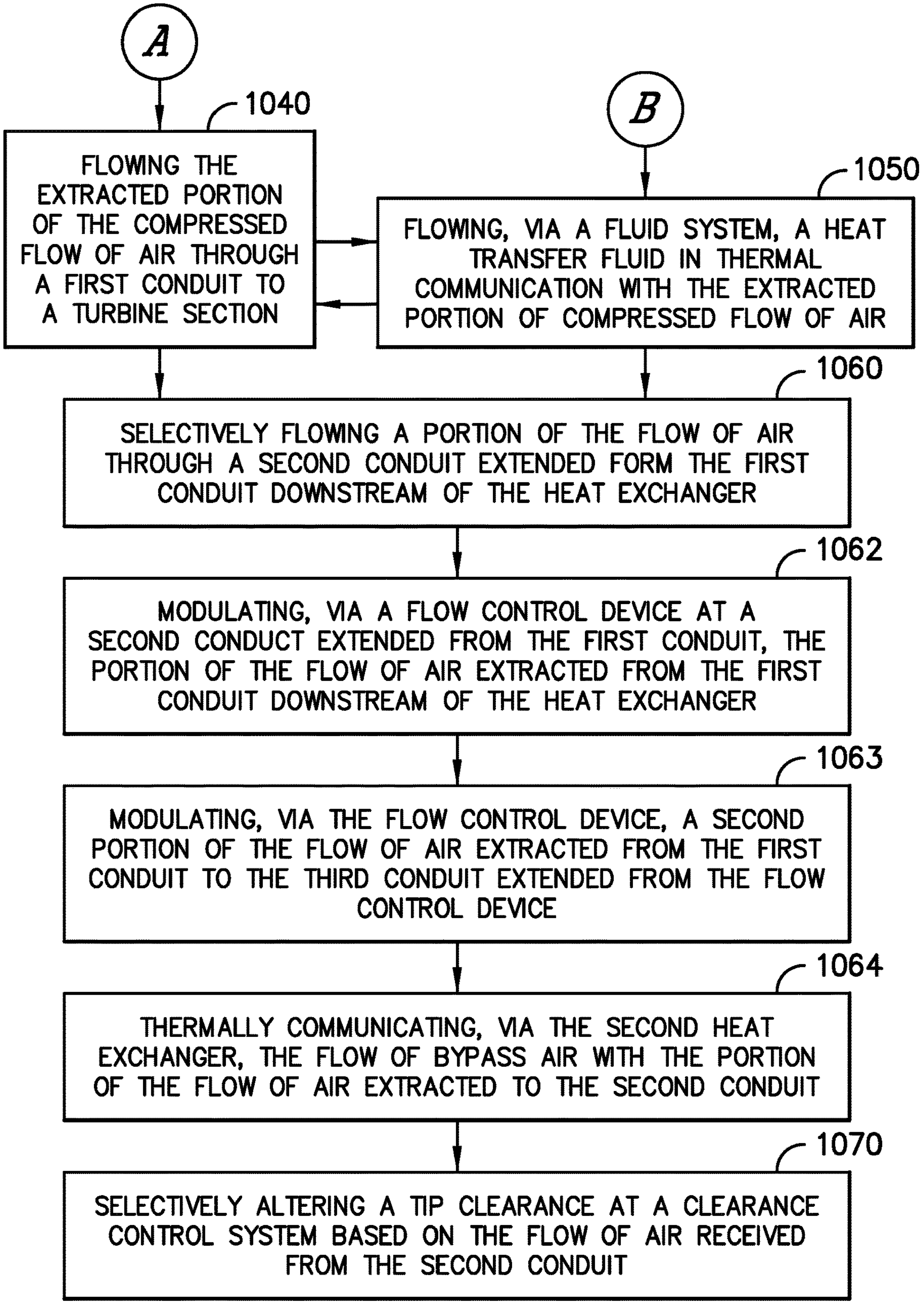

Referring now to FIGS. 7A-7B, a flowchart outlining steps of the method 1000 for operating an engine is provided. The steps of the method 1000 may be stored as instructions and/or executed as operations by embodiments of the engine 10 and the computing system 1210 provided herein. Accordingly, the method 1000 may be a computer-implemented method in which one or more steps is stored as instructions at the memory 1214 at the computing system 1210 and/or executed by one or more processors 1212 at the computing system 1210. The computing system 1210 may cause embodiments of the engine such as described herein with regard to FIGS. 1-6 to perform operations such as outlined in the flowchart in FIGS. 7A-7B and described further herein with regard to method 1000.

Referring to the flowchart in FIGS. 7A-7B, and in conjunction with any one or more embodiments depicted in FIGS. 1-6, the method 1000 includes at 1010 initiating rotation of one or both of a high speed spool or a low speed spool to, e.g., generate compressed air for combustion within a combustion section of a core engine. In various embodiments, a motive force, such as a starter motor or turbine air starter (not shown), initiates rotation of one or both of the high speed spool 34 or the low speed spool 36 to generate an initial airflow through the core gas flowpath 70 into the combustion section 26 for mixing with a liquid and/or gaseous fuel before igniting to generate combustion gases.

The method 1000 further includes at 1020 compressing a flow of air through the compressor section. During operation of the engine 10, a flow of air 171 is received at the fan section 16. A portion of the flow of air 171 enters the turbomachine 14 through the core engine inlet 20, such as depicted schematically via arrows 172. The flow of air 172 is pressurized across successive rows or stages of compressor blades at the compressor section 21. Particularly, the low speed compressor 22 may include a low pressure compressor or booster relative to the high speed compressor 24 including a high pressure compressor. In certain embodiments, a portion of the flow of air 172 compressed by the low speed compressor 22 may be bled or re-routed from the core gas flowpath 70, such as to control stall, surge, or operability at one or both of the compressors 22, 24. The high speed compressor 24 receives the flow of air 172 and further compresses the flow of air, such as depicted schematically via arrows 173 in FIGS. 1-3. The successive stages of compressor blades energize the flow of air 173, such as to increase the pressure and temperature of the flow of air 173 before entering the combustion section 26, such as depicted via arrows 174.

The method 1000 includes at 1030 extracting a portion of the compressed flow of air from the compressor section, such as described above. The method 1000 at 1030 may particularly include extracting the portion of compressed flow of air into a first conduit and bypassing a combustion section, such as provided above with regard to the first conduit 110. The method 1000 includes at 1040 flowing the extracted portion of the compressed flow of air through the first conduit (e.g., first conduit 110) to a turbine section. In a particular embodiment, the first conduit bypasses the combustion section when flowing the extracted portion of compressed flow of air to the turbine section. With regard to FIGS. 1-6, a portion of the flow of air at the compressor section 21 is bled or removed from the core gas flowpath 70 and provided to the first conduit 110, such as depicted schematically via arrows 91 in FIGS. 1-5. Particular embodiments depicted herein may receive the flow of air 91 from the compressed flow of air 173, 174 from the high speed compressor 24. In still other embodiments, the flow of air 91 may be received from the compressed flow of air 172 from the low speed compressor 22.

It should be appreciated that embodiments of the engine 10 provided herein advantageously receive relatively lower-pressure and lower-temperature flows of air from the compressor section 21, and may further avoid structures, complexities, actuatable devices, valves, and associated weight and efficiency losses related to mixing high-pressure and high-temperature air with low-pressure and low-temperature air from the fan bypass airflow passage. It should furthermore be appreciated that, while particular operating conditions and operating envelopes are provided herein, the engine 10 and/or method 1000 provided herein allows for performing one or more steps at any engine operating condition, including up to 100% of an overall power output. However, particular advantages and benefits are provided herein with regard to operation of the engine at engine operating conditions defining a majority of an operating envelope. As such, methods and structures provided herein allow for improved efficiency and reduced fuel consumption.

In various embodiments, the method 1000 at 1030 includes extracting the portion of the compressed flow of air when the compressed flow of air at the compressor section is between approximately 20 pounds per square inch (psi) and approximately 60 psi. In a particular embodiment, the method 1000 at 1030 includes extracting the portion of the compressed flow of air when the compressed flow of air at the compressor section is between approximately 30 psi and approximately 50 psi. In a particular embodiment, the method 1000 includes at 1035 receiving the portion of the compressed flow of air from the compressor section, in which the portion of the compressed flow of air is between approximately 20 psi and approximately 60 psi, or between approximately 30 psi and approximately 50 psi. In a still particular embodiment, the method 1000 at 1030 and/or 1035 is performed continuously or constantly relative to a discrete engine operating condition, such as to allow for a fixed flow of air relative to the discrete engine operating condition.

In a still particular embodiment, the method 1000 includes at 1028 operating the engine at an engine condition corresponding to between approximately 55% and approximately 75% of an operating envelope, or between approximately 60% and approximately 70% of the operating envelope, such as described above. In certain embodiments, one or both steps of the method 1000 at 1030 and at 1035 is preceded by, or contemporaneous to, the method 1000 at 1028. In still certain embodiments, the method 1000 includes at 1029 operating the engine between approximately 75% and approximately 90% of the overall power output (e.g., rated thrust) of the engine, such as described above. In a still particular embodiment, the method 1000 at 1029 includes operating the engine between approximately 80% and approximately 88% of the overall power output of the engine. In certain embodiments, one or more ranges provided herein may define a discrete engine operating condition at which the method 1000 at 1030 and/or 1035 is performed continuously or constantly. In still particular embodiments, the method 1000 includes performing the steps at 1028 and 1029 concurrently.

The method 1000 may include at 1050 flowing, via a fluid system, a heat transfer fluid in thermal communication with the extracted portion of compressed flow of air, such as described above. In a particular embodiment, the fluid system 220 depicted in FIGS. 4-5 is a liquid and/or gaseous fuel system configured to provide a flow of liquid and/or gaseous fuel to the compressed flow of air 174 to generate combustion gases 175. In such an embodiment, the fuel is the heat transfer fluid 221 in thermal communication with the flow of air 91 via the first heat exchanger 141. The flow of fuel receives heat or thermal energy from the relatively hotter flow of air 91, which may advantageously alter certain properties of the fuel, such as viscosity, density, or other property that may desirably affect combustion, fuel-air mixing, swirl, emissions generation, vibrations, or smoke and particulate generation.

In certain embodiments, the method 1000 may further include flowing, via the fluid system, a plurality of heat transfer fluids in thermal communication with the extracted portion of compressed flow of air. In various embodiments, the method 1000 includes providing one or more flows of fuel, lubricant, hydraulic fluid, refrigerant, a supercritical fluid, or another flow of air at the heat transfer fluid in thermal communication with the extracted flow of air.

The method 1000 may further include modulating the flow of the heat transfer fluid to control a temperature of the extracted flow of air (e.g., flow of air 91). Modulating the flow of heat transfer fluid may include adjusting a mass or volumetric flow rate, pressure, or temperature of the heat transfer fluid provided in thermal communication with the extracted flow of air.

As provided above, the flow of liquid and/or gaseous fuel is mixed with the compressed air from the compressor section and ignited to form combustion gases 175. The combustion gases 175 flow from the combustion section 26 to the turbine section 27, and particularly to the high speed turbine 28 and the low speed turbine 30. As the combustion gases 175 expand at the turbine section 27, energy is released to drive rotation of the respective turbines 28, 30, which drives their respective spools 34, 36, compressors 22, 24, and fan blades 40.

It should be appreciated that the combustion gases 175 release variable amounts of heat at the turbine section 27 based on the engine operating condition. Accordingly, heat release and turbine rotor speed may alter the tip clearance between turbine rotor blade tips and surrounding shrouds, such as further described below. It should be appreciated that improved aerodynamic and operating efficiencies are generally achieved by minimizing tip clearances. Accordingly, clearance control systems are utilized to modulate the tip clearance based on engine operating condition to improve engine efficiency and performance.

The method 1000 may further include at 1060 selectively flowing a portion of the flow of air through a second conduit (e.g., second conduit 120) extended from the first conduit (e.g., first conduit 110) downstream of the heat exchanger (e.g., first heat exchanger 141). In a particular embodiment, the method 1000 includes at 1062 varying or modulating, via a flow control device (e.g., flow control device 130) at the second conduit extended from the first conduit, the portion of the flow of air extracted to the second conduit (e.g., second conduit 120) from the first conduit (e.g., first conduit 110) downstream of the heat exchanger (e.g., first heat exchanger 141). In a still particular embodiment, the method 1000 includes at 1063 modulating, via the flow control device, a second portion of the flow of air extracted from the first conduit to the third conduit extended from the flow control device, such as depicted in FIGS. 4-5 via arrows 195. In a still particular embodiment, the method 1000 at 1060 is executed contemporaneously with the method 1000 at one or more of steps 1028, 1030, or 1035. Accordingly, the method 1000 may allow for continuous, constant, or fixed flow of air from the compressor section through the first conduit, while modulating or varying the flow of air through the second conduit. In particular embodiments, the method 1000 allows for continuous, constant, of fixed flow of air from the compressor section through the first conduit and to the turbine section, or particularly the bearing assembly, while modulating or varying the flow of air through the second conduit to a clearance control system. As such, modulating the flow of air through the second conduit allows for a variable flow of air through to a clearance control system (e.g., clearance control system 275) independent of whether the operating condition of the engine is steady-state (e.g., non-transient or non-varying) or transient (e.g., changing).

The method 1000 may further include at 1070 selectively varying, altering, or modulating a tip clearance at a clearance control system based on the flow of air received from the second conduit via step 1060 and/or 1062. It should be appreciated that the method 1000 provided herein may further provide for a method for operating a clearance control system and bearing assembly. Such methods may allow for variable flow rate, temperature, pressure, or other physical property of the flow of air through the second conduit to the clearance control system, while allowing for substantially constant or continuous flows of air through the first conduit relative to an engine operating condition.

Although not depicted in FIGS. 7A-7B, the method 1000 may further include generating a flow of bypass air through a bypass airflow passage. A portion of the flow of air 171 passes across the plurality of fan blades 40 and bypasses the turbomachine 14, such as depicted via arrows 176 in FIGS. 1-3. The flow of air 176 that enters the bypass airflow passage 48, depicted schematically via arrows 177, is large in volume or mass and cold relative to the flow of air pressurized by the compressor section 21 within the turbomachine 14. FIG. 5, which may be applied to the embodiments of the engine 10 in any of FIGS. 1-3, particularly depicts the relatively cold flow of bypass air 177 in thermal communication with the flow of air 194 via the second heat exchanger 142. Accordingly, the method 1000 may further include at 1064 thermally communicating, via the second heat exchanger, the flow of bypass air with the portion of the flow of air extracted to the second conduit.

The embodiment of the engine 10 depicted and described with regard to FIG. 5 may allow for increased magnitudes of heat transfer from the flow of air 194, such as via the flow of bypass air 177 at the bypass airflow passage 48. Furthermore, the embodiment depicted in FIG. 5, when applied to an open rotor configuration such as depicted in FIG. 2, may overcome challenges associated with removing nacelles and passages, tubes, or conduits that may route through nacelles to provide air for heat exchangers, clearance control systems, and/or bearing assemblies. Accordingly, the method 1000, when applied to an open rotor configuration such as described herein, may provide for a method for operating an open rotor engine, or particularly, a method for operating a clearance control system for an open rotor engine, or more particularly, a method for operating a clearance control system and bearing assembly for an open rotor engine.

Figure 8:
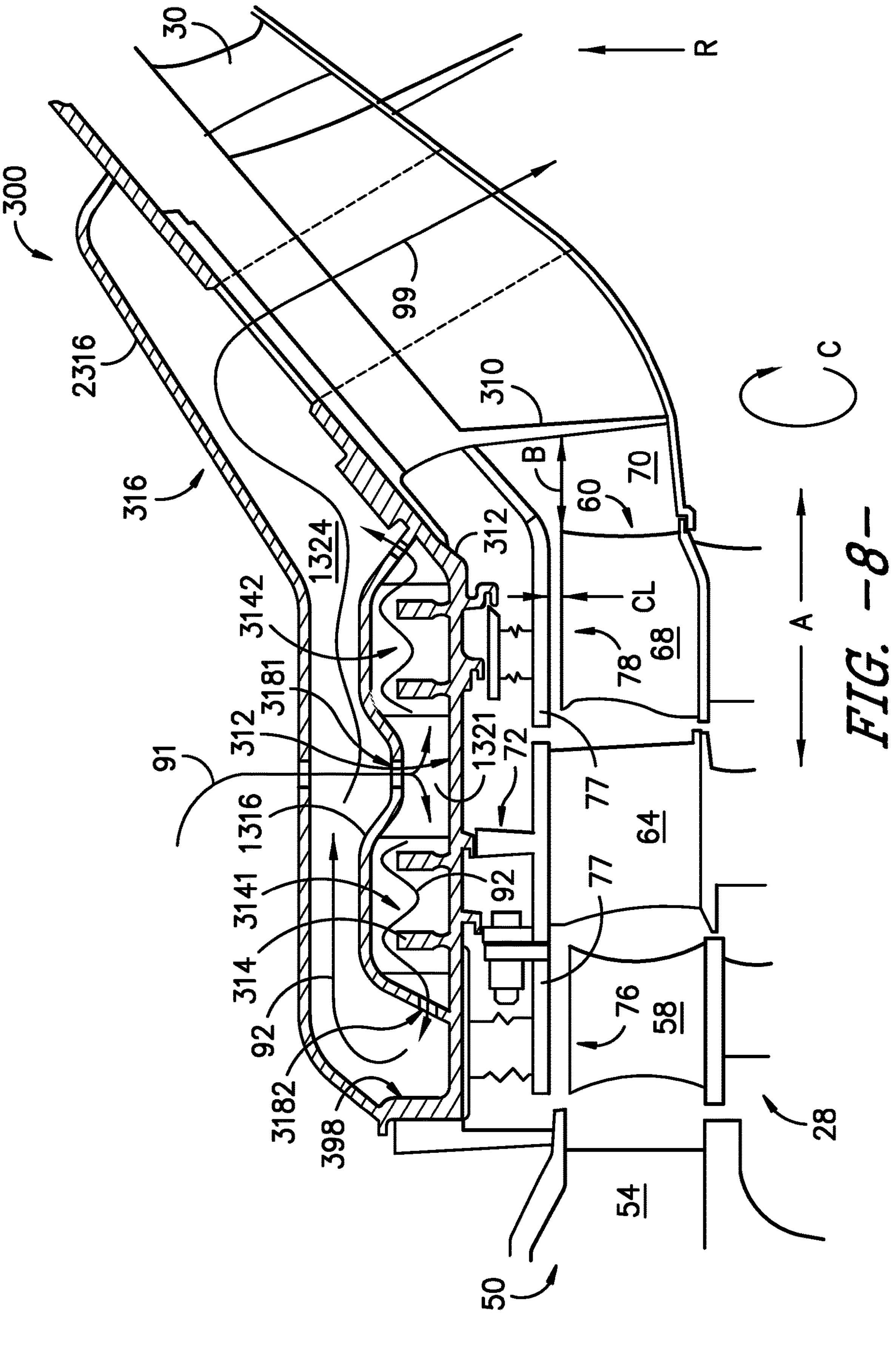
FIGS. 8-11 are exemplary schematic cross-sectional views of embodiments of a portion of a turbine section and casing in accordance with aspects of the present disclosure.

Referring now to FIG. 8, an enlarged cross sectioned view is provided of a turbine section portion of a turbomachine 14 in accordance with one or more of FIGS. 1-3, as may incorporate various embodiments of the present disclosure. As shown in FIG. 8, a first turbine assembly is formed by the high speed turbine 28. A first stage 50 of the first turbine assembly includes a plurality of first turbine rotor blades 58 extended within the core gas flowpath 70, and further includes an annular array of stator vanes 54 (only one shown) axially spaced from an annular array of turbine rotor blades 58 (only one shown) at the high speed turbine 28. In a particular embodiment, the high speed turbine 28 further includes a last stage 60 which includes an annular array of stator vanes 64 (only one shown) axially spaced from an annular array of turbine rotor blades 68 (only one shown). The turbine rotor blades 58, 68 extend radially outwardly from and are coupled to the high speed spool 34 (FIG. 1, FIG. 2). The stator vanes 54, 64 and the turbine rotor blades 58, 68 at least partially define the core gas flowpath 70 for routing combustion gases from the combustion section 26 (FIG. 1, FIG. 2) through the high speed turbine 28.

As further shown in FIG. 8, the high speed turbine 28 may include one or more shroud assemblies, each of which forms an annular ring about an annular array of rotor blades. For example, a shroud assembly 72 may form an annular ring around the annular array of rotor blades 58 of the first stage 50 and the annular array of turbine rotor blades 68 of the last stage 60. In general, the shroud assembly 72 is radially spaced from blade tips 76, 78 of each of the rotor blades 58, 68. A radial or clearance gap CL is defined between the blade tips 76, 78 and respective inner surfaces of the shroud segments 77. The shroud assembly 72 generally reduces leakage from the core gas flowpath 70. The shroud assembly 72 can include a plurality of walls forming thermal control rings 314 that assist in controlling thermal growth of the shroud thereby controlling the radial deflection or clearance gap CL. Thermal growth in the shroud assemblies is actively controlled with the clearance control system 275. The clearance control system 275 is used to minimize radial blade tip clearance CL between the outer blade tip and the shroud, particularly during cruise operation of the engine, such as described herein.

Downstream along the core gas flowpath 70, or aft of the high speed turbine 28, is a second turbine assembly formed by the low speed turbine 30. As previously described herein, the second turbine assembly is rotatably separate from the first turbine assembly, such as described in regard to the high speed turbine 28 and the low speed turbine 30 above with reference to FIG. 1.

The casing 300 surrounds the high speed turbine 28. The casing 300 includes a plurality of vanes 310 extended through the core gas flowpath 70 aft of the first turbine assembly formed by the high speed turbine 28 and forward of the second turbine assembly formed by the low speed turbine 30. The shroud assembly 72 is coupled to the casing 300 at an outer casing wall 312. The outer casing wall 312 is an annular wall surrounding the shroud assembly 72 and extended along a circumferential direction C relative to the centerline axis 12 (FIGS. 1-3). The outer casing wall 312 is extended along an axial direction A forward of the rotor blades 58 of the first stage 50 of the high speed turbine 28 (also referred to as the first stage of rotor blades 58) and aft of the rotor blades 68 of the second or last stage 60 of the high speed turbine 28 (also referred to as the second stage of rotor blades 68).

The plurality of vanes 310 is extended from the outer casing wall 312. The plurality of vanes 310 is extended into the core gas flowpath 70, In certain embodiments further described herein, one or more of the plurality of vanes 310 may be hollow or include conduits or passages allowing for fluid flow within the vane. The outer casing wall 312 of the casing 300 is extended along the axial direction A from a downstream end or trailing edge of the aft-most stage of the rotor blades 68 to at least an upstream end or leading edge of the plurality of vanes 310, such as depicted at dimension B in FIG. 8.

It should be appreciated that conventional turbine casings include separable or joined flanges, such as bolted flanges or welded flanges, between a high speed turbine casing and a downstream casing, such as an inter-turbine frame, mid-turbine frame, intermediate speed turbine casing, or low speed turbine casing. Embodiments of the casing 300 provided herein, include unitary, integral structures, such as formed by one or more additive manufacturing processes. Embodiments provided herein further form integral, continuous, compliant structures, allowing for the unitary, integral extension of the casing 300 such as provided herein, or further including one or more features integrally formed to the casing 300 such as provided herein.

A plurality of walls forming thermal control rings 314 is extended along the circumferential direction C and extended outward along a radial direction R from the outer casing wall 312. In various embodiments, the thermal control rings 314 include forward thermal control rings 3141 positioned outward along the radial direction R from the first stage of rotor blades 58, or particularly from the blade tips 76 of the rotor blades 58, of the high speed turbine 28. In certain embodiments, such as depicted in FIG. 8, the forward thermal control rings 3141 are positioned in alignment along the axial direction A to the first stage of rotor blades 58 (overlapping axial positions). In another particular embodiment, the thermal control rings 314 include aft thermal control rings 3142 positioned outward along the radial direction R from the last stage 60 of rotor blades 68, or particularly from the blade tips 78 of the rotor blades 68, of the high speed turbine 28. In certain embodiments, such as depicted in FIG. 8, the aft thermal control rings 3142 are positioned in alignment along the axial direction A to the last stage 60 of rotor blades 68 of the high speed turbine 28 (overlapping axial positions).

The forward and aft thermal control rings 3141 and 3142 are provided to more effectively control blade tip clearance CL (shown in FIG. 8) with a minimal amount of time lag and thermal control airflow (cooling or heating depending on operating conditions). The forward and aft thermal control rings 3141 and 3142 are formed with the outer casing wall 312 as an integral, singular, unitary structure of the casing 300. The thermal control rings 314 provide thermal control mass to more effectively move the shroud segments 77 along the radial direction R to adjust the blade tip clearances CL. Such clearance control may provide for lower operational specific fuel consumption (SFC).

The integral, unitary structure of the thermal control rings 314 and the outer casing wall 312, with the outer casing wall particularly extended aft of the second or last stage of the rotor blades 68 of the high speed turbine 28, may allow for improved clearance control, improved thermal control, and improved cooling flow. The structures provided herein allow for the thermal control rings 314 to be positioned radially outward of and in axial alignment with each stage of the high speed turbine rotor, such as to improve clearance control at each respective stage. The structures provided herein further allow for obviating flanges between the high speed turbine and an intermediate turbine frame between the high speed turbine and a downstream low speed turbine (or intermediate speed turbine, such as described herein).

Embodiments of the integral casing provided herein are generally produced by one or more additive manufacturing processes such as described above. Although additive manufacturing may generally be applied to form various structures or integrate various components, it should be appreciated that combinations of integrated structures provided herein may overcome issues associated with integrating structures while providing unexpected benefits. In one instance, axially-extended casings may generally be susceptible to thermal distortion that may ovalize the core flowpath, which may adversely affect rotor operation as the rotors may rub within a non-concentric flowpath. As such, simple integration of relatively hot casings surrounding the high speed turbine with the relatively cooler casing surrounding downstream vanes proximate to the low speed turbine may adversely affect overall engine operation. In another instance, such large, axially-extended masses may require additional cooling flow, which results in increased fuel consumption and overall losses in engine performance.

Embodiments of the engine provided herein overcome such issues at least in part by the positioning of the thermal control rings in axial alignment and radially outward of the respective stages of the high speed turbine blades. Removing flanges between a casing surrounding the high speed turbine rotors and a vane casing or frame downstream of the high speed turbine allows for the thermal control rings to be advantageously positioned as disclosed herein.

Other embodiments of the engine provided herein overcome such issues at least in part by improved cooling flow structures, passages, and conduits. In various embodiments, a manifold assembly 316 surrounds the thermal control rings 314 along the circumferential direction C and the axial direction A. The manifold assembly 316 is configured to provide a flow of fluid, such as the flow of air 192 from the compressor section 21 such as depicted and described in regard to FIGS. 4-5, to the thermal control rings 314.

Figure 9:
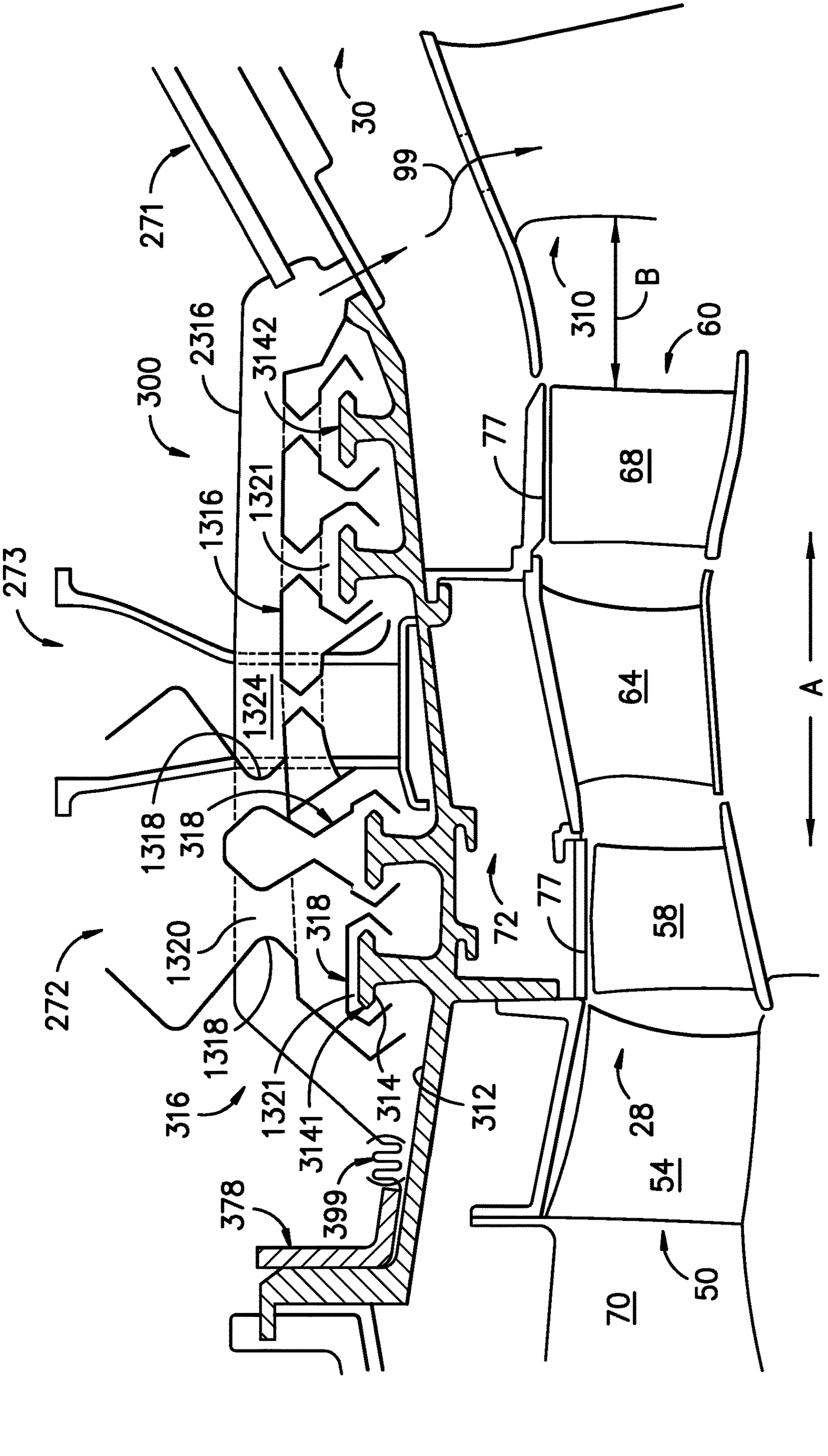
Figure 10:
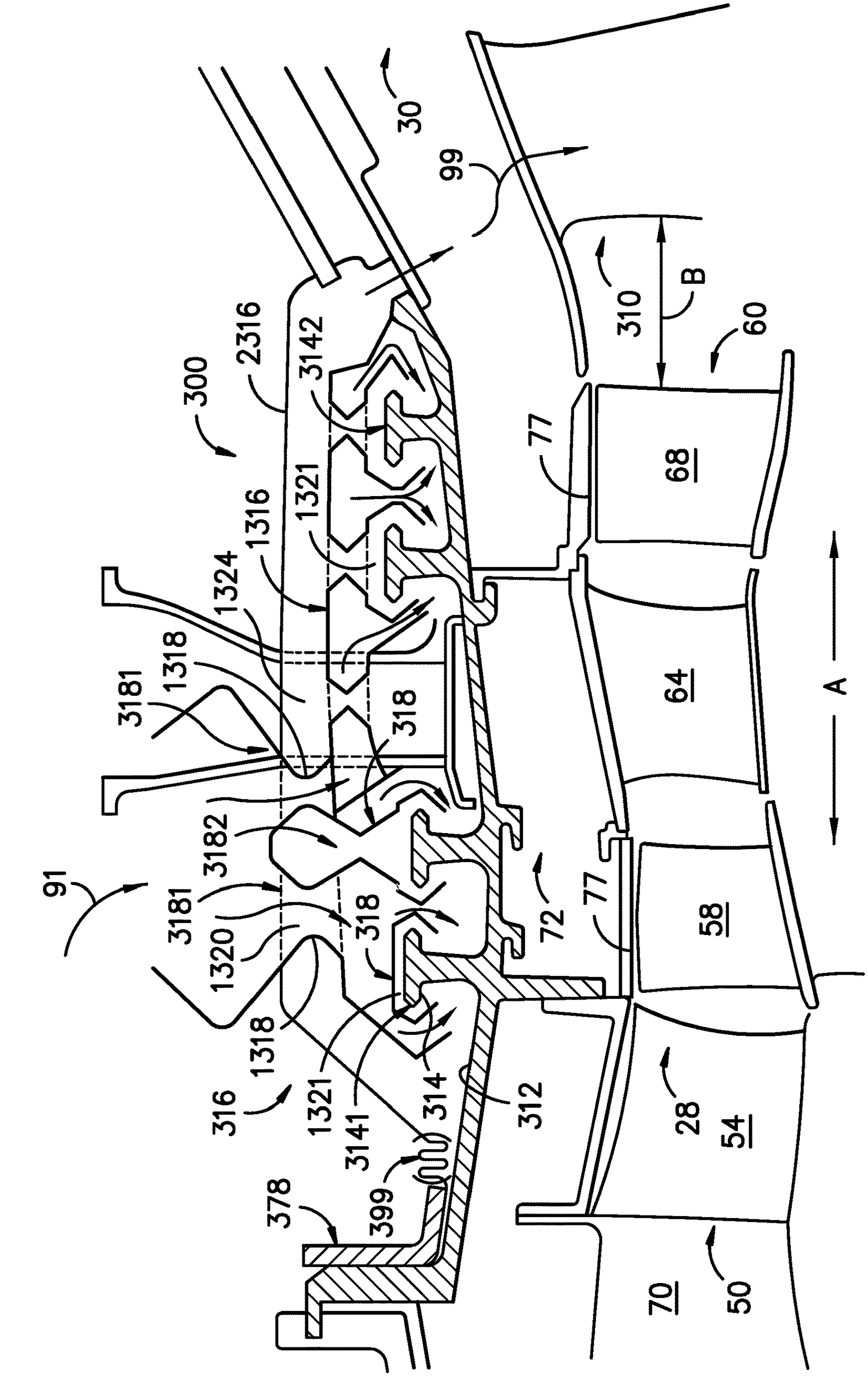
Figure 11:
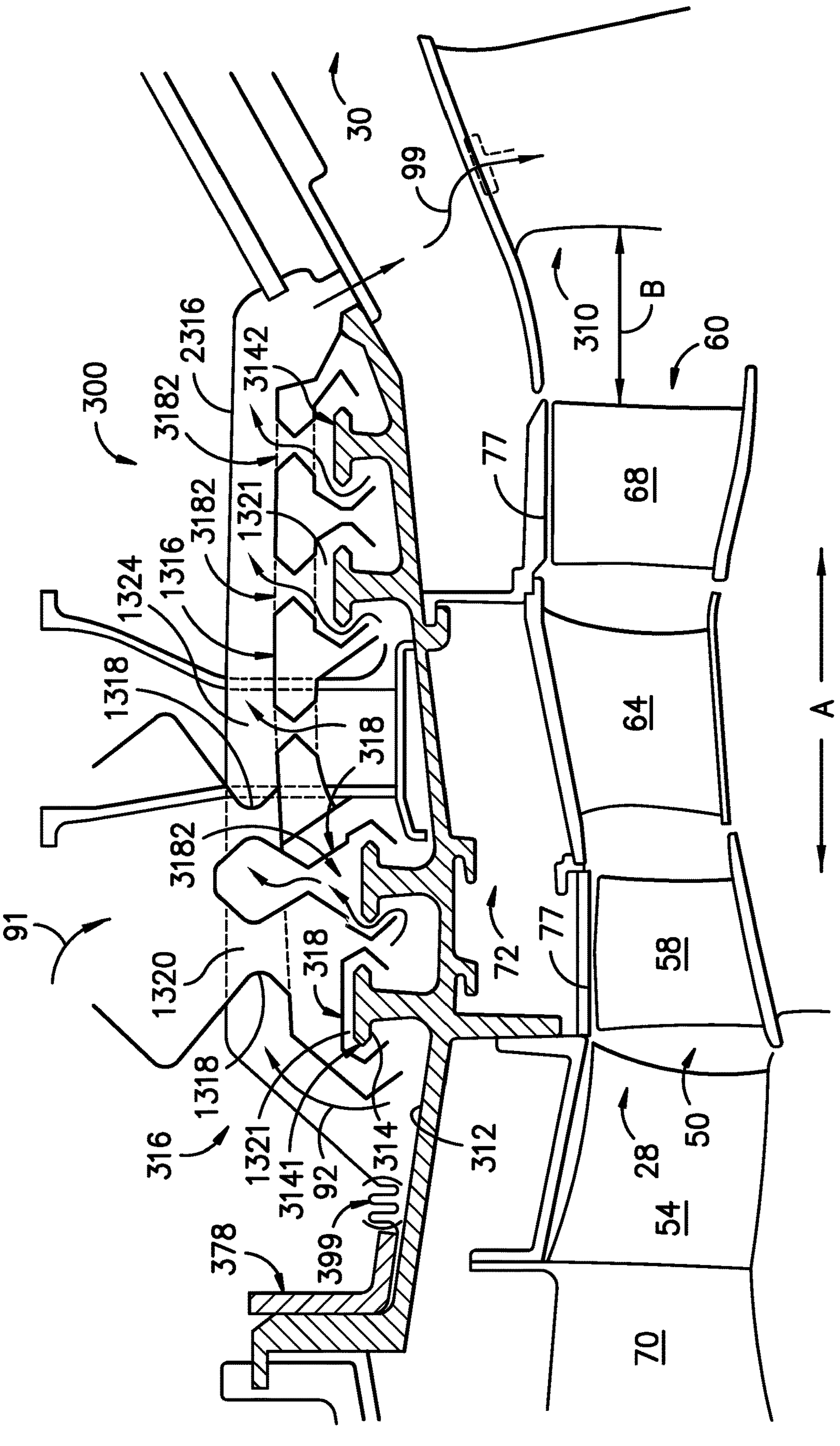
Figure 14:
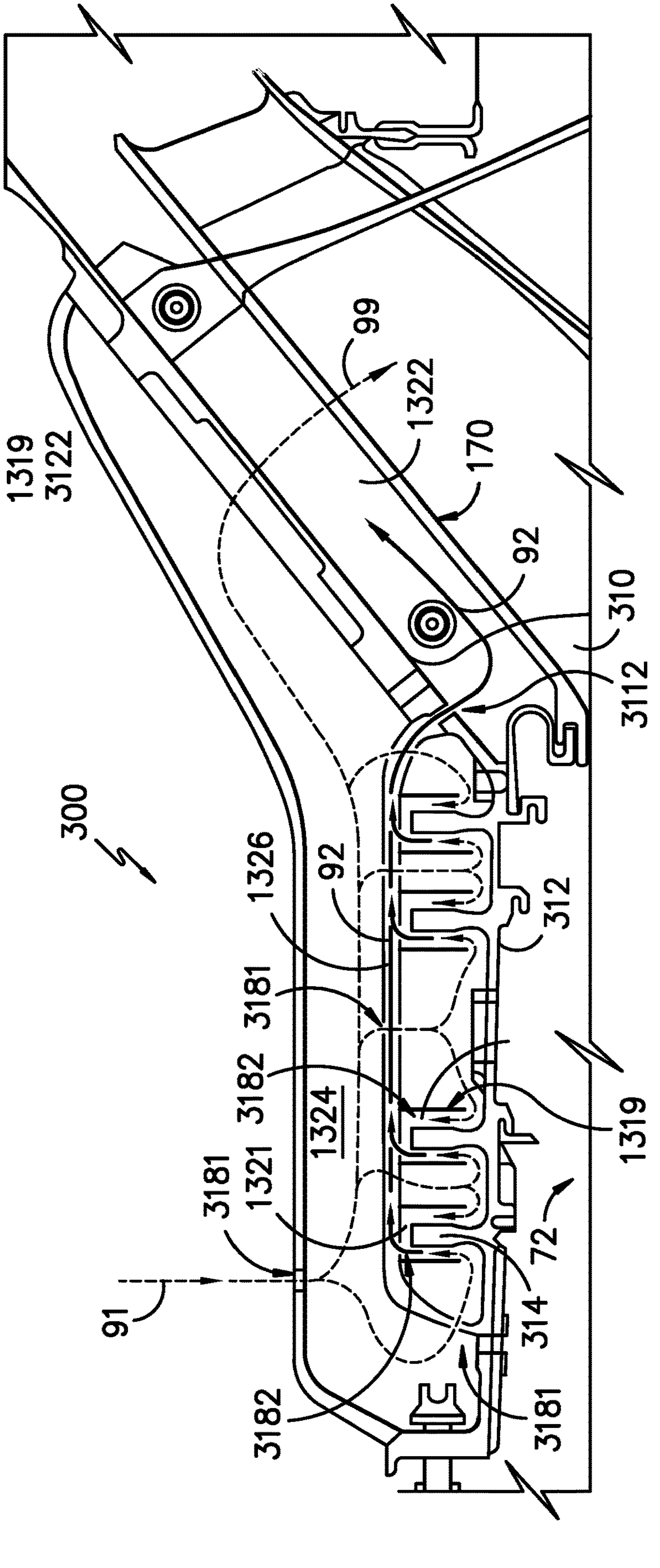
FIG. 14 is an exemplary schematic cross-sectional view of an embodiment of a portion of a turbine section and casing in accordance with aspects of the present disclosure.

Referring still to FIG. 8 and now also to FIGS. 9-11, and FIG. 14, further exemplary embodiments are provided. The embodiment depicted in FIG. 8, FIG. 9, and FIG. 14 may be configured similarly as one another, such as further described below. FIGS. 9-11 provide views of flows of fluid and openings at various cross-sections of an embodiment of the engine 10 at different circumferential positions of the engine 10. Each of the embodiments may be formed via one or more manufacturing methods known in the art. In FIG. 14, the embodiment provided may include double-wall structures that may be formed via an additive manufacturing process. Various embodiments provided herein may be formed as integral, unitary structures, such as via an additive manufacturing process or other appropriate manufacturing process.

Referring to the various embodiments depicted in FIGS. 8-11 and FIG. 14, the manifold assembly 316 is extended along the axial direction A forward and aft of the plurality of axially-spaced stages of the plurality of walls forming the thermal control rings 314. In a particular embodiment, such as depicted in FIG. 14, the manifold assembly 316 is extended aft along the axial direction A of the plurality of vanes 310. In various embodiments, such as in the exemplary embodiment of FIG. 8, the manifold assembly 316, the outer casing wall 312, and the plurality of walls forming the thermal control rings 314 of the casing 300 is a single, integral, unitary structure, such as described herein. In particular embodiments, such as in the exemplary embodiment of FIG. 8, the manifold assembly 316 includes a plurality of concentric walls integrally formed and surrounding the outer casing wall 312. In certain embodiments, the manifold assembly 316 includes an inner manifold 1316 radially inward of and concentric to an outer manifold 2316. In still certain embodiments, the inner manifold 1316 is a double wall structure concentric to the outer manifold 2316.

Referring particularly to FIGS. 9-10, certain embodiments of the casing 300 include a corrugated feature 399. The corrugated feature 399 includes a shape defining ridges or grooves configured to mitigate formation of thermal expansion stresses at the casing 300. In certain embodiments, the corrugated feature 399 is formed at the manifold assembly 316. In a still particular embodiment, the corrugated feature 399 may be formed at an inner manifold 1316 or an outer manifold 2316. The corrugated feature 399 may allow for the unitary, integral formation of the manifold assembly 316 with the outer casing wall 312, such as described in various embodiments herein.

Figure 15:
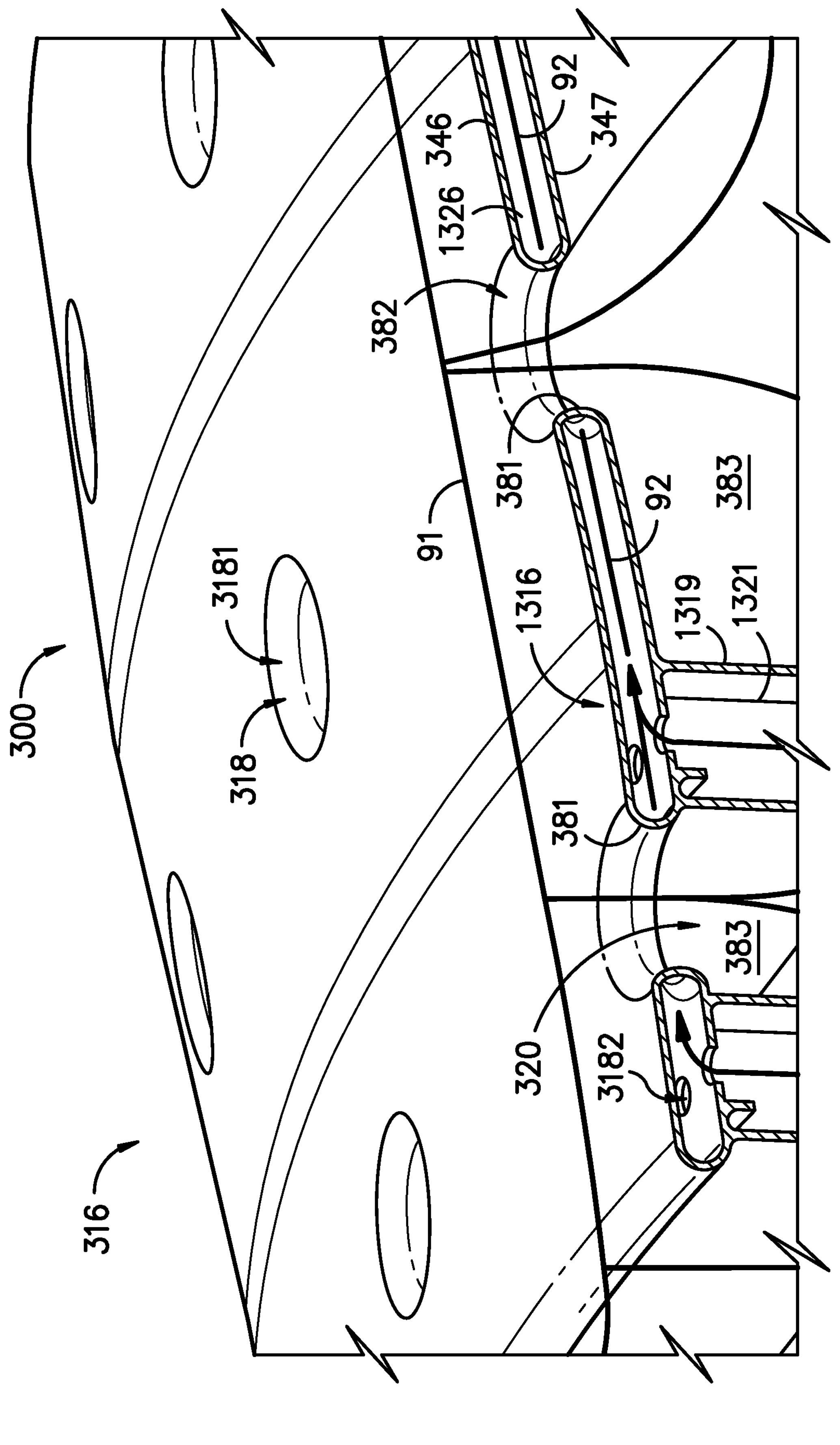
FIG. 15 is an exemplary perspective view of an embodiment of a portion of a manifold of the turbine section in accordance with aspects of the present disclosure.

Referring now briefly to FIG. 15, the manifold assembly 316 includes a plurality of openings 318 surrounding the plurality of walls forming the thermal control rings 314 at the casing 300. The plurality of openings 318 allow for the flow of fluid, depicted schematically via arrows 91, to come into thermal communication with the thermal control rings 314 for desired heat transfer effect. In various embodiments, the plurality of openings 318 include an inlet opening 3181 configured to allow the flow of air 91 into a first cavity 1321 in thermal communication with the thermal control rings 314, as described further below. The plurality of openings 318 may further include an outlet opening 3182 configured to allow at least a portion of the flow of air 91, depicted schematically via flow of air 92, to egress the first cavity 1321 and enter an inner wall conduit 1326 such as described further below.

An inlet opening wall 381 is extended between an outer portion 346 and an inner portion 347 of the double wall structure formed by the inner manifold 1316. The inlet opening wall 381 forms an inlet opening flowpath 382 that extends through the double wall structure fluidly separated from the inner wall conduit 1326. The inlet opening 3181 and the inlet opening wall 381 allow for the flow of air 91 to pass from a conduit 1324 surrounding the inner manifold 1316 to enter a plenum 383 formed between adjacent thermal control rings 314. Particularly, the inlet opening wall 381 extends between the outer portion 346 and inner portion 347 of the inner manifold 1316. The inlet opening flowpath 382 formed by the inlet opening wall 381 allows the flow of air 91 to enter the plenum 383 while being fluidly segregated from the flow of air 92 through the inner wall conduit 1326.

Referring back particularly to FIGS. 9-10, as discussed, the manifold assembly 316 includes the inner manifold 1316 surrounding the thermal control rings 314 along the circumferential direction C and the axial direction A. The manifold assembly 316 depicted further includes the outer manifold 2316 surrounding the inner manifold 1316, as discussed above. A passage wall 1318 is extended to the outer manifold 2316 from the inner manifold 1316 to form a passage 1320 within the passage wall 1318.

In certain embodiments, such as depicted in FIG. 8, the outer manifold 2316 of the manifold assembly 316 is extended along the axial direction A at or aft the plurality of vanes 310. The outer manifold 2316 is further connected to the outer casing wall 312 at or aft of the plurality of vanes 310. In still certain embodiments, such as depicted in FIGS. 9-11, the inner manifold 1316 is extended to a location forward along the axial direction A of the plurality of vanes 310 (terminating forward of the plurality of vanes 310). The inner manifold 1316 is also extended to a location aft along the axial direction A of the plurality of walls forming the thermal control rings 314. As such, the inner manifold 1316 is connected to the outer casing wall 312 forward of the plurality of vanes 310 and aft of the thermal control rings 314.

The first cavity 1321 discussed above with reference to FIG. 15 (also depicted in FIGS. 9-11) is formed between the inner manifold 1316 and the outer casing wall 312. The thermal control rings 314 are surrounded by the inner manifold 1316 at a location within the first cavity 1321 between the inner manifold 1316 and the outer casing wall 312. The passage 1320 allows for fluid communication with the first cavity 1321 between the inner manifold 1316 and the outer casing wall 312. The passage 1320 further allows for the flow of air 91 to enter into thermal communication with the thermal control rings 314.

In various embodiments, the conduit 1324 briefly mentioned above is formed between the outer manifold 2316 and the inner manifold 1316. The conduit 1324 is in fluid communication with the first cavity 1321 and is fluidly separated from passage 1320 by the passage wall 1318. In particular embodiments, the passage wall 1318 is extended from the outer manifold 2316 to the inner manifold 1316 through the conduit 1324.

Figure 13A:
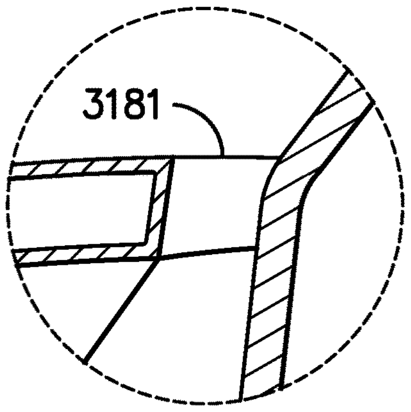
FIGS. 13A-13D are exemplary sectional views of an embodiment of the manifold provided in FIG. 12.
Figure 13B:
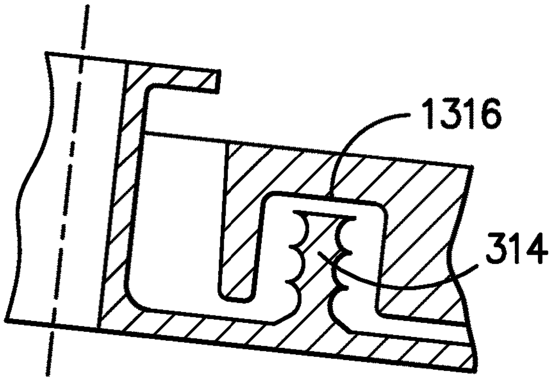
Figure 13C:
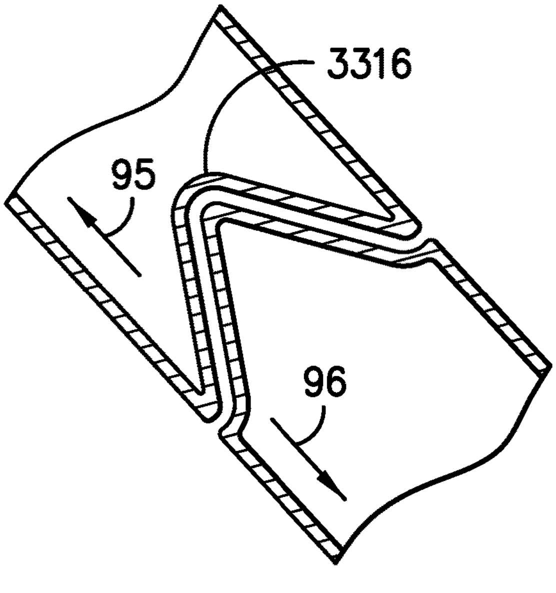
Figure 13D:
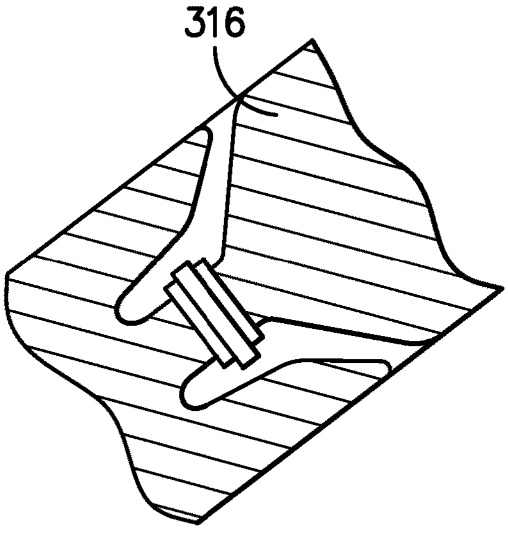

Referring particularly to FIGS. 9-11, and further in regard to FIG. 14, the conduit 1324 is further extended in fluid communication through one or more of the plurality of vanes 310. FIG. 10 and FIG. 14 particularly depict the flow of air 91 entering into thermal communication and fluid communication with the thermal control rings 314 in the first cavity 1321. FIG. 10 particularly depicts the flow of air 91 entering into thermal communication and fluid communication with the thermal control rings 314 in the first cavity 1321. In various embodiments, the first cavity 1321 is formed to direct the flow of fluid to thermal contact portions of the thermal control rings directly, such as in a perpendicular direction. FIG. 11 and FIG. 14 particularly depict the flow of air 92 egressing from the first cavity 1321 through the conduit 1324 and then in serial flow through one or more of the plurality of vanes 310 (as airflow 99, discussed below). In certain embodiments, the thermal control rings 314 are formed with the outer casing wall 312 to desirably improve clearance control. In one embodiment, such as depicted in FIG. 13B, the thermal control ring 314 includes outer surfaces extended as a ridge, groove, or at acute or zig-zagging angles (see more detailed description below).

Referring briefly particularly to FIG. 14, and further depicted in the detailed perspective view in FIG. 15, in certain embodiments, the inner manifold 1316 is a double wall structure forming the inner wall conduit 1326 between the double wall structure of the inner manifold 1316. The inner wall conduit 1326 may extend in fluid communication to a second cavity 1322 formed between the outer casing wall 312 and an outer wall 170 of the core gas flowpath 70. In such embodiments, the unitary, integral casing 300, or furthermore integral to embodiments of the manifold assembly 316, allow for separate flows into the plurality of vanes 310. Particularly, the flow of air 91 enters the conduit 1324 from a compressor section such as depicted and described with regard to FIGS. 1-6. A portion of the flow of air 91, depicted via arrows 92, flows into the first cavity 1321 and then into the inner wall conduit 1326 formed at the double wall structure. The flow of air 92 then flows into one or more of the plurality of vanes 310. Furthermore, another portion of the flow of air 91, depicted via arrows 99, remains in the conduit 1324 and flows into one or more of the plurality of vanes 310. In certain embodiments, the flows 92, 99 are isolated or fluidly separated from one another until mixing at the plurality of vanes 310. In other embodiments, the flows 92, 99 remain fluidly separated and are provided to separate respective vanes 310, or separate conduits within each vane 310. Embodiments of the casing 300 and the manifold assembly 316 allow for improved thermal efficiency and improved overall engine efficiency, such as via providing secondary uses of the flow of fluid after thermal communication with the thermal control rings 314, rather than outputting the flows to atmosphere or to an under-cowl area of the engine.

In certain embodiments, the outer wall 170 of the core gas flowpath 70 forms the outer shroud segment 77 of the shroud assembly 72. The outer shroud segment 77 is exposed to the core gas flowpath 70, and may include thermal barrier coatings or materials configured to withstand heat from the combustion gases. The outer shroud segment 77 may further be configured to at least partially rub with one or more stages of blades at the core gas flowpath 70.

Figure 16:
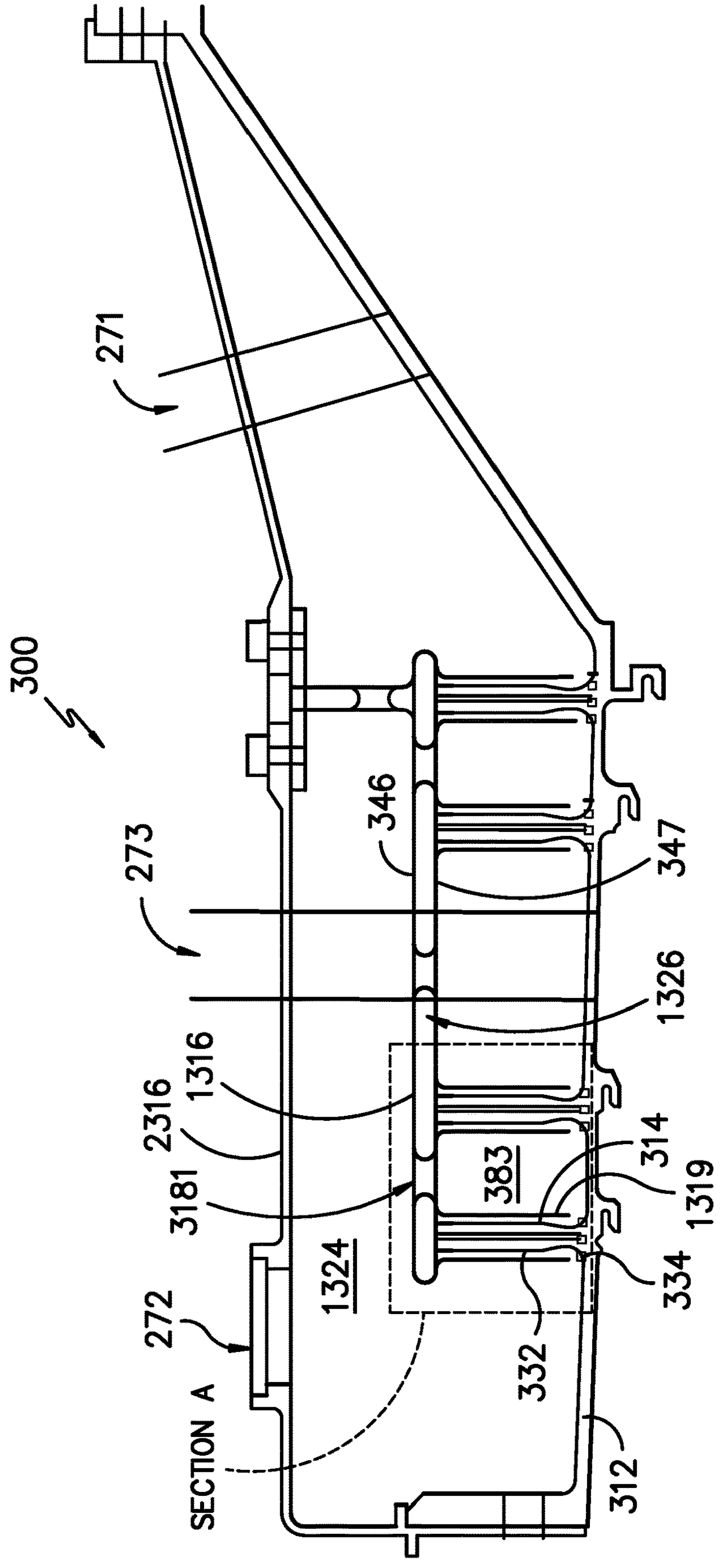
FIG. 16 is an exemplary schematic cross sectional view of an embodiment of a portion of a turbine section and casing in accordance with aspects of the present disclosure.
Figure 17:
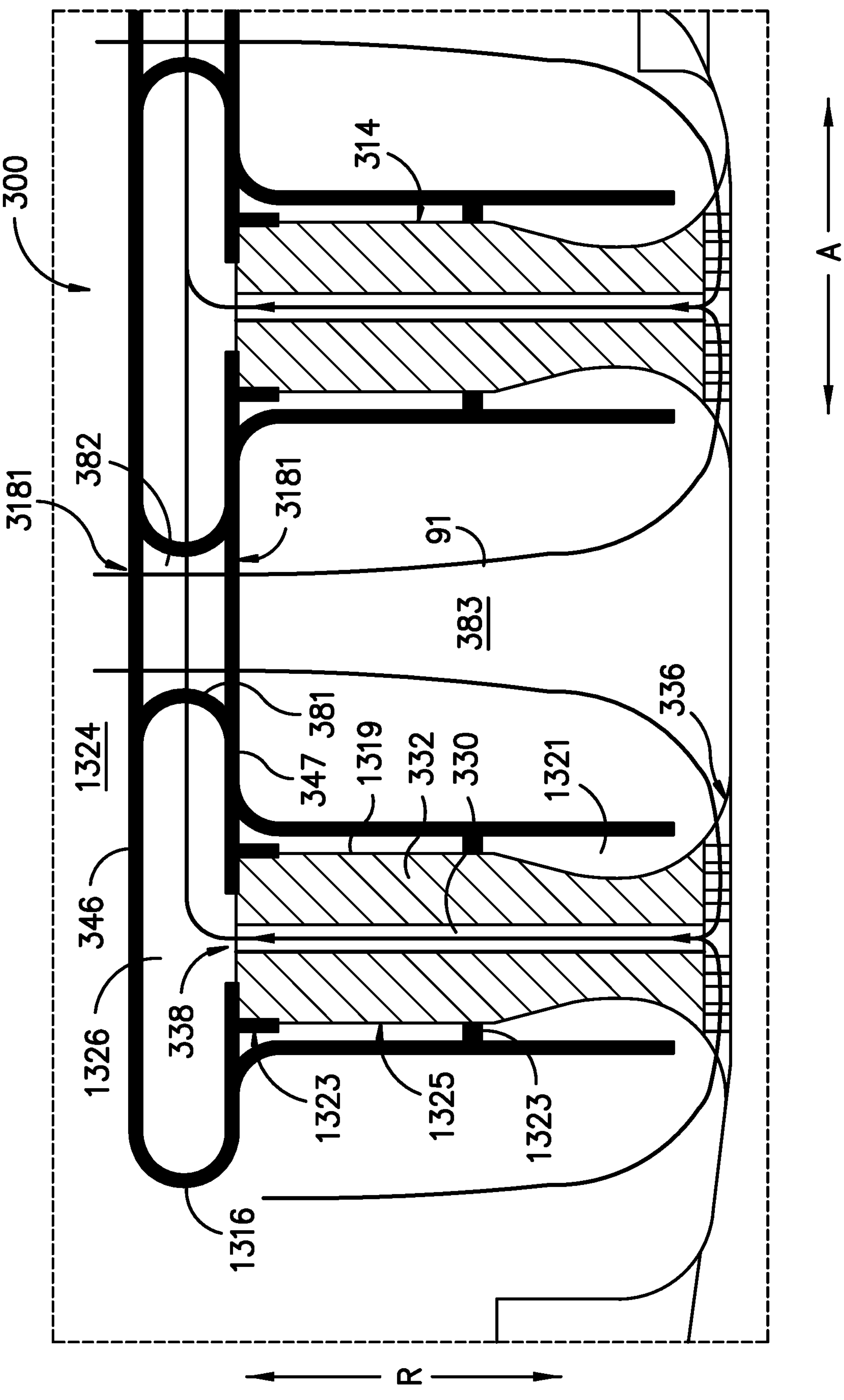
FIG. 17 is a detailed view of an exemplary schematic cross sectional view of the embodiment of FIG. 16 in accordance with aspects of the present disclosure.

Referring still to FIG. 14, and further depicted in FIG. 15, FIG. 16 providing a side view of the casing 300 of FIG. 15, and FIG. 17 providing a close-up view of Section A in FIG. 16, the inner manifold 1316 includes a plenum wall 1319 extended from the inner manifold 1316 and surrounding the thermal control ring 314. In certain embodiments, the plenum wall 1319 is extended radially inward from the inner portion 347 of the inner manifold 1316. The plenum wall 1319 may be formed as an integral, unitary, or monolithic structure with the inner manifold 1316 including the outer portion 346 and the inner portion 347. The first cavity 1321 is formed between an outer surface 1325 of the thermal control ring 314 and the plenum wall 1319.

Referring particularly to FIGS. 16 and 17, the thermal control ring 314 includes a wall or body 332 extended outward, such as outward along the radial direction R, from the outer casing wall 312. In various embodiments, such as described above with regard to the plurality of thermal control rings 314, the body 332 is extended substantially annularly along the circumferential direction C (FIGS. 1-3).

Referring more particularly to FIG. 17, the body 332 forms an internal flowpath 330 to allow a flow of fluid through the thermal control ring 314. The flow of fluid through the body 332 allows for a temperature or thermal gradient at the thermal control ring 314 to be desirably controlled, altered, or modulated by changes in temperature or flow rate of the flow of fluid through the flowpath 330 at the body 332. The flow of fluid through the body 332 may furthermore allow for one or more structures attached or integrally formed to the thermal control ring 314, such as the outer casing wall 312 or the shroud assembly 72, to move based at least in part on thermal changes provided by the flow of fluid, such as to desirably control the clearance gap CL (FIG. 8) between the rotor blades 58, 68 and the shroud assembly 72.

Figure 18:
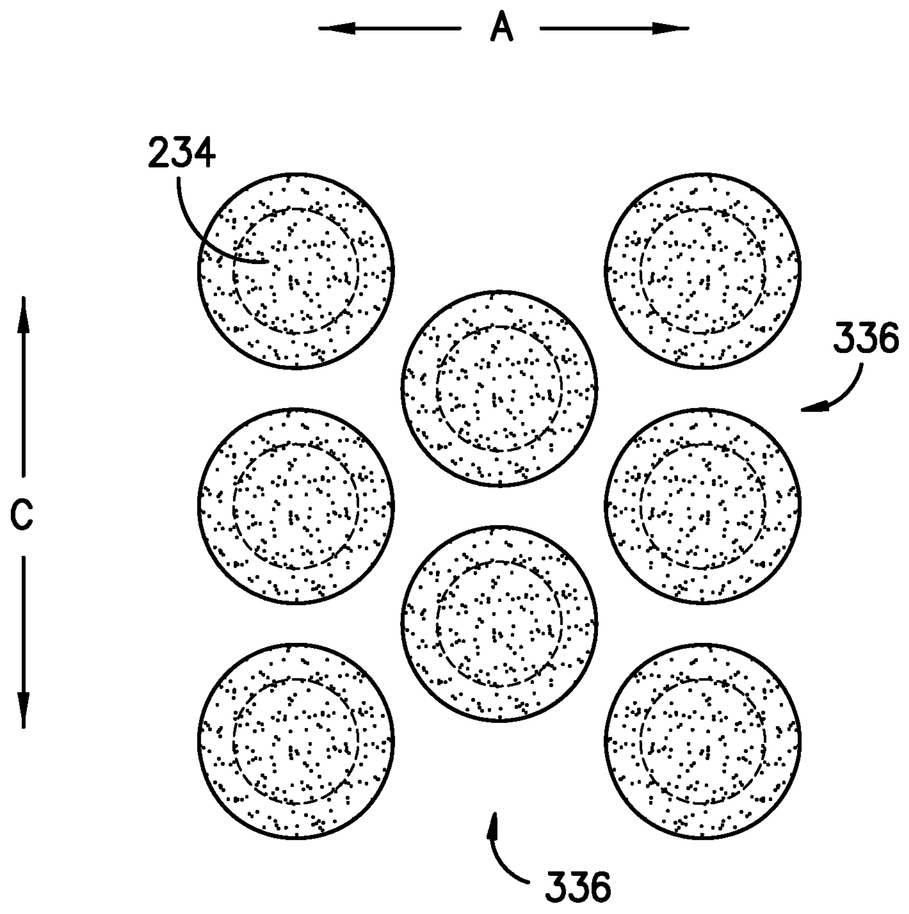
FIG. 18 is a top-down view of an exemplary embodiment of a plurality of pins of the thermal control ring in accordance with aspects of the present disclosure.

Referring still to FIG. 17, the exemplary casing 300 depicted further includes a plurality of pins 334 extended along a radial direction R of the engine 10 incorporating the casing 300 from the outer casing wall 312 to the body 332. Referring briefly also to FIG. 18, a top-down view of the plurality of pins 334 depicts each pin 334 is depicted. As shown in FIGS. 17 and 18, each pin 334 spaced apart from one another along an axial direction A of the engine 10 incorporating the casing 300 and along a circumferential direction C of the engine 10 incorporating the casing 300 (FIG. 18). In such a manner, adjacent pins 334 define a space 336 therebetween.

Referring back particularly to FIG. 17, the flowpath 330 extended radially through the body 332 is further extended in fluid communication to the gap or space 336 provided between the plurality of pins 334. The thermal control ring 314 may form the flowpath 330 as a plurality of discrete, round or slotted flowpaths in adjacent arrangement along the circumferential direction C. In other embodiments, the thermal control ring 314 forms the flowpath 330 as a plurality of arcuate sections extended at least partially along the circumferential direction C. The flow of air, depicted schematically via arrows 91 is received and provided in fluid communication with the thermal control rings 314 in accordance with any one or more embodiments depicted and described above with regard to FIGS. 1-15.

During operation, the flow of air 91 passes through the spaces 336 and across the plurality of pins 334 to enter into the flowpath 330 within the body 332. During operation, the flow of air 91 progresses radially through the body 332 and egresses the body 332 through an outlet opening 338 at the flowpath 330. The outlet opening 338 is formed by the body 332 distal to the spaces 336 to allow for fluid communication from the flowpath 330 to the inner wall conduit 1326 formed within the double wall structure of the inner manifold 1316. The flow of fluid egressed from the thermal control ring 314, depicted schematically via arrows 92, may flow through the inner wall conduit 1326 in accordance with any one or more embodiments depicted and described with regard to FIGS. 1-15.

Referring still to FIG. 17, in various embodiments, a seal 1323 is positioned to contact the outer surface 1325 of the thermal control ring 314 and the plenum wall 1319. Additionally, or alternatively, the seal 1323 may be formed or positioned in contact with the inner portion 347 of the inner manifold 1316 and the outer surface 1325 of the body 332 of the thermal control ring 314. The seal 1323 inhibits a flow of fluid through the first cavity 1321. In a particular embodiment, the seal 1323 may form a structural member configured to provide structural support to the inner manifold 1316 and/or the thermal control ring 314. The seal 1323 may further support the body 332 relative to the plurality of pins 334. In certain embodiments, the seal 1323 is a braze, weld, or other member attaching the plenum wall 1319 to the thermal control ring 314 at the first cavity 1321. It should be appreciated that the seal 1323 and the plenum wall 1319 may each extend substantially co-directional with the thermal control ring 314 as either a monolithic annular component or as a plurality of arcuate sections positioned in circumferential arrangement.

In particular embodiments, the outer casing wall 312, the plurality of pins 334, and the body 332 of the thermal control rings 314 are a unitary, integral structure, such as may be formed by an additive manufacturing process, or other appropriate manufacturing process. In still particular embodiments, the inner portion 347, the outer portion 346, and the plenum wall 1319 are together formed as a unitary, integral structure of the inner manifold 1316. In certain embodiments, the thermal control rings 314 and outer casing wall 312 are a unitary structure separate from the inner manifold 1316. In still certain embodiments, the unitary structures are formed from an additive manufacturing process.

Figure 19:
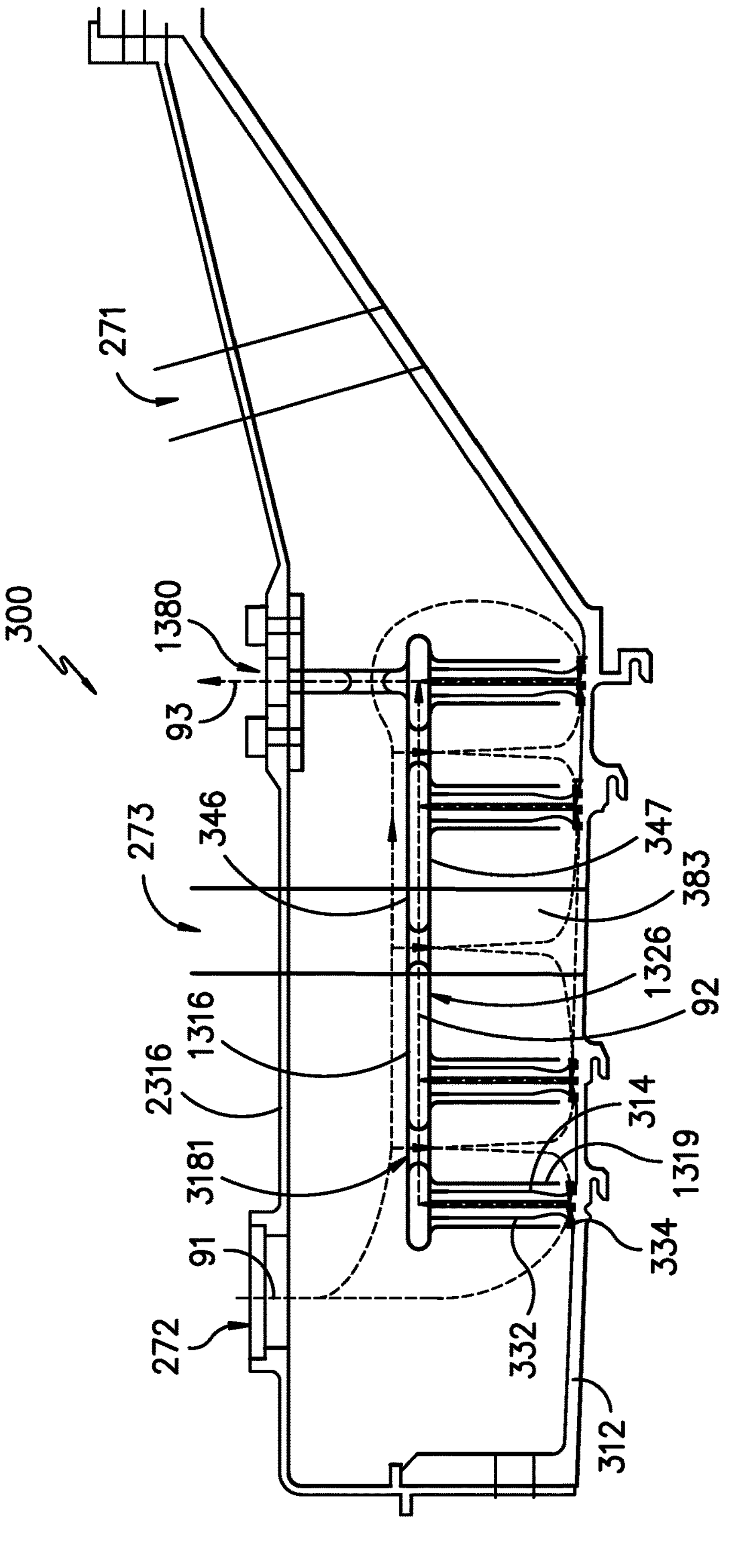
FIG. 19 is an exemplary schematic of flows of air through the turbine section and casing of FIG. 16 in accordance with aspects of the present disclosure.

Referring now to FIG. 19, an exemplary embodiment is provided depicting an operation of the engine 10. The embodiment provided in FIG. 19 is configured substantially similarly to the embodiment depicted and described with regard to FIG. 16. Operation of the system provided here may be based substantially as described with regard to embodiments of the engine 10 as depicted and described with regard to FIGS. 1-6 and FIGS. 7A-7B. In FIG. 19, the flow of air 91 is received at the second location 272, such as an opening provided through the outer manifold 2316. The flow of air 91 is received into the conduit 1324 formed between the outer manifold 2316 and the inner manifold 1316. The flow of air 91 is routed into the plenum 383 via the inlet opening 1381 formed through the inner manifold 1316. The flow of air 91 is routed across the plurality of pins 334 and through the flowpath 330 (see FIG. 17) into the inner wall conduit 1326 (see FIG. 17).

In one embodiment, such as depicted in FIG. 19, the flow of air 92 may egress from the inner wall conduit 1326 to outside of the casing 300 or engine 10, such as depicted via arrows 93 through opening 1380. The flow of air 93 may egress heat or thermal energy from the thermal control rings 314 to an atmospheric condition, or to an under-casing or under-cowl area.

Figure 20:
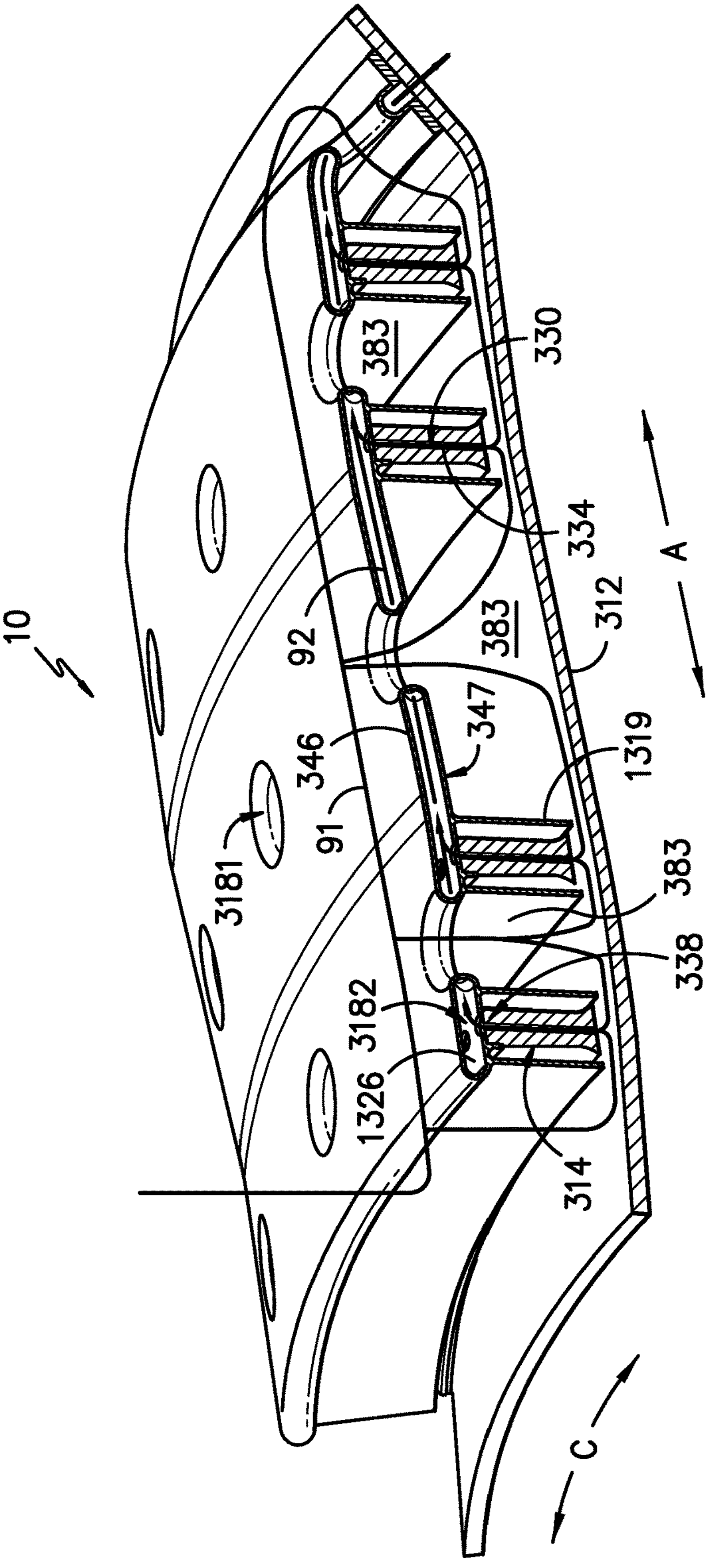
FIG. 20 is a perspective view of a portion of the engine in accordance with aspects of the present disclosure.

Referring now to FIG. 20, a perspective view of a portion of the engine 10 is provided. The embodiment provided in FIG. 20 is configured substantially similarly to the embodiment described with regard to FIGS. 16-19. In particular, FIG. 20 depicts a plurality of discrete flowpaths 330 extended in adjacent circumferential arrangement through the thermal control rings 314. A plurality of outlet openings 3182 is formed through the inner portion 347 of the inner manifold 1316 corresponding to the plurality of flowpaths 330 and outlet openings 338 at the thermal control rings 314. The engine 10 may accordingly form a plurality of flowpaths 330 and outlet openings 338 at the thermal control rings 314 in adjacent arrangement along the circumferential direction C corresponding to the plurality of outlet openings 3182 formed through the inner portion 347 of the inner manifold 1316. Such arrangement may allow for the flow of air 92 to egress from within the thermal control ring 314 into the inner wall conduit 1326.

Figure 21:
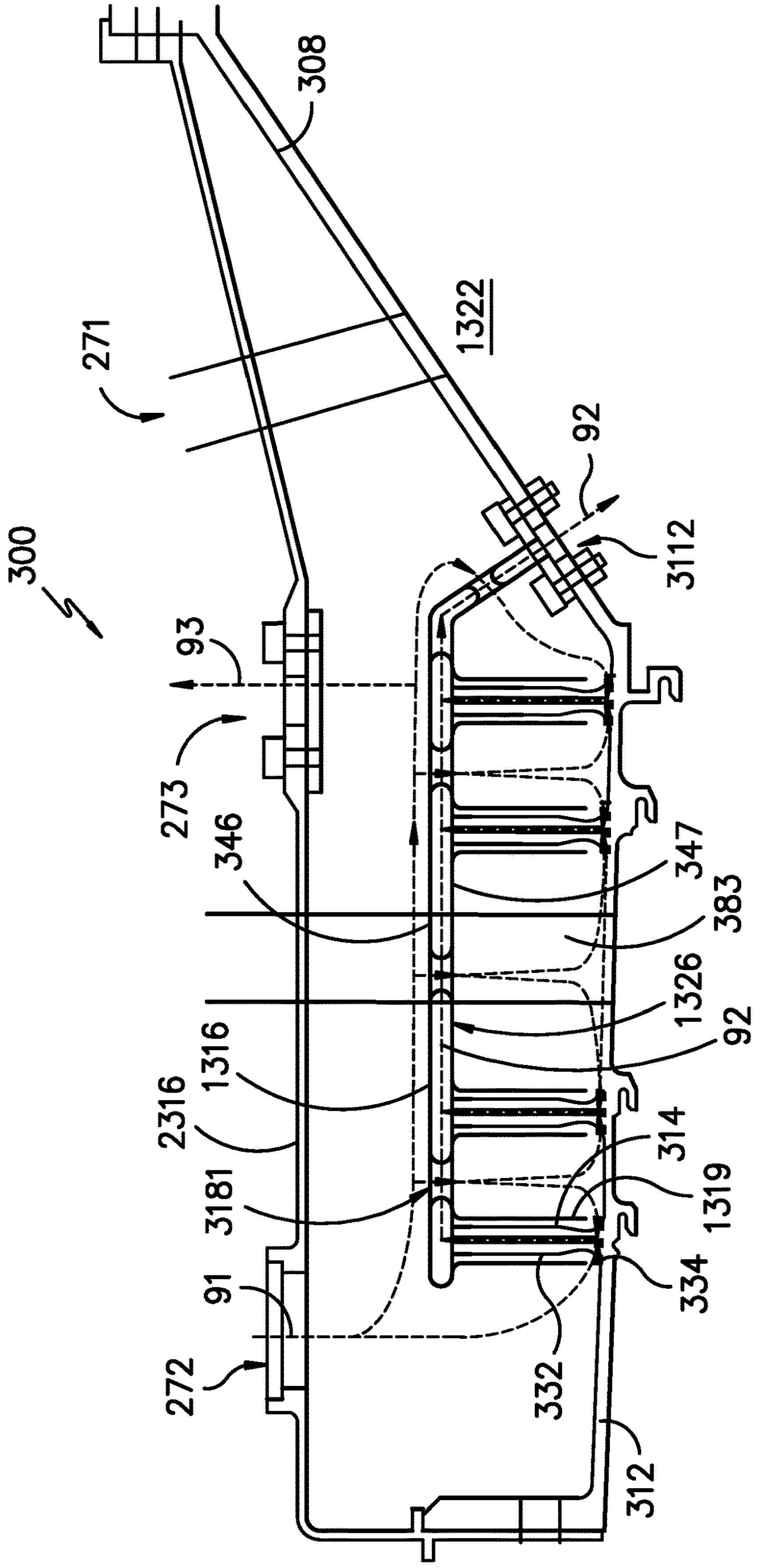
FIG. 21 is a cross-sectional view of the embodiment of the engine provided in FIG. 20 in accordance with aspects of the present disclosure.

Referring now to FIG. 21, a side cross-sectional view of the embodiment provided in FIG. 20 is provided. The embodiment in FIG. 21 further depicts the inner wall conduit 1326 in fluid communication with the second cavity 1322 positioned at the turbine frame 308. An opening 3112 is formed through the turbine frame 308 to allow the flow of air 92 to egress into thermal communication with the turbine frame 308.

Figure 12:
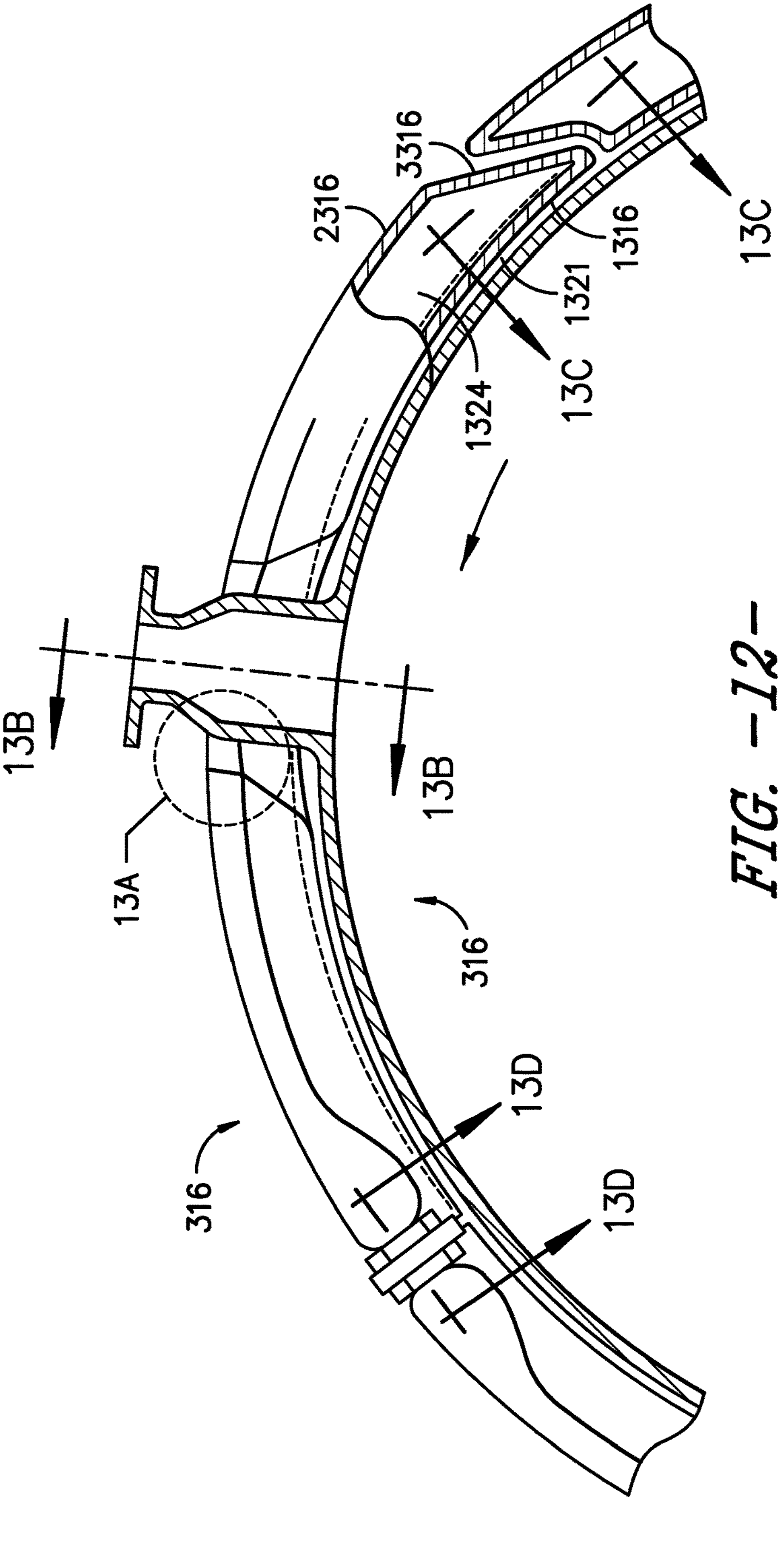
FIG. 12 is an exemplary perspective view of an embodiment of a portion of a manifold of the turbine section in accordance with aspects of the present disclosure.

Referring briefly now back to FIG. 12 and FIGS. 13A-13D, additional aspects of the present disclosure are described. FIG. 12 provides a partial circumferential view of an embodiment of the manifold assembly 316. FIGS. 13A-13D furthermore provide sectional views of the embodiment depicted in FIG. 12 (labels for each of FIGS. 13A-13D are indicated in FIG. 12). As previously described, various embodiments of the manifold assembly 316 are formed via one or more additive manufacturing processes. Referring particularly to FIG. 12 and the close-up view of FIG. 13C, in various embodiments, a member 3316 is extended to the inner manifold 1316 and the outer manifold 2316. The member 3316 is extended at an acute angle (e.g., a V-, Z-, or other angled cross-section) from the inner manifold 1316 to the outer manifold 2316. In various embodiments, the member 3316 is extended along a first direction, depicted schematically via arrows 95, and a second direction opposite of the first direction, depicted schematically via arrows 96.

Embodiments of the improved turbine casing 300, turbine section 27, and engine 10 provided herein allow for improved clearance control, cooling fluid distribution, reduced weight, and improved engine efficiency. Embodiments of the engine 10, the casing 300, and manifold assembly 316 provided herein include integral, unitary structures, such as the casing extended over the stages of the high speed turbine, or further including the inter-turbine frame, or further including all or part of the manifold, such as may be formed by additive manufacturing processes that would not have heretofore been possible or practicable. Embodiments depicted and described herein allow for improved and advantageous positioning of thermal control rings 314, flowpaths 330 therethrough, and the plurality of pins 334, for improved clearance control response, improved formation and positioning of openings, passages, and conduits to allow for more efficient heat transfer fluid utilization and movement, and reduced weight, such as via obviating flanges and sub-assemblies into integral components. Particular combinations of these features allow for improved heat transfer properties and reduced thermal gradients. Improved heat transfer properties particularly include lowering a heat transfer coefficient at certain features, such as the plurality of walls, body, pins, and/or flowpaths forming the thermal control rings 314, in contrast to known clearance control systems. Such improvements may mitigate or eliminate undesired or excessive deformation, ovalization, bowing, or other changes in geometry of the casing 300 that may adversely affect deflections or result in undesired contact to the turbine rotor blades 58 at the high speed turbine 28.

Embodiments of the engine 10 and the casing 300 provided herein include an integral, unitary casing for the high speed turbine 28 together with a turbine center frame or mid-turbine frame 308, formed by the outer casing wall 312 and the plurality of vanes 310 and positioned downstream along the core gas flowpath 70 of the high speed turbine 28 and upstream along the core gas flowpath 70 of a low- or intermediate-pressure turbine, such as depicted at turbine 30. Embodiments provided herein further include e.g., an integral, unitary clearance control manifold configured to provide heat transfer fluid to thermal control rings. The integral, unitary structures may further allow for improved positioning of the thermal control rings relative to the turbine rotors, such as to provide improved clearance control across the turbine rotor assembly.

It should be appreciated that the conduits 110, 120, 123, flow control devices 130, or heat exchangers 141, 142 depicted and described with regard to FIGS. 1-6 may be provided to the casing 300, manifold assembly 316, and other structures depicted and described with regard to FIGS. 8-21. However, various embodiments of the engine 10 provided herein may include one or more of the conduits 110, 120, 123, flow control devices 130, or heat exchangers 141, 142 providing flows of air to any appropriate clearance control system, turbine section, or bearing assembly. Such structures, when combined with any appropriate clearance control system, turbine section, or bearing assembly, may provide one or more advantages and benefits described herein. Alternatively, various embodiments of the engine 10 provided herein may include one or more of the casings 300 or the manifold assemblies 316 receiving flows of air from any appropriate conduits, passageways, flowpaths, tubes, or other structures. Such structures, when combined with any appropriate conduit or heat exchanger, may provide one or more advantages and benefits described herein. Benefits and advantages described with regard to either the conduits, flow control devices, heat exchangers, casings, or manifolds, when combined together, may compound such benefits and advantages described herein.

Embodiments of the conduits 110, 120, 123 and heat exchangers 141, 142 provided herein may be formed, at least in part, by one or more additive manufacturing processes such as described herein. For instance, the first heat exchanger 141 may be integrally formed with the first conduit 110, or the second heat exchanger 142 may be integrally formed with the second conduit 120, or portions thereof. In another instance, all or part of the first conduit 110, including one or more inlet manifolds 111, outlet manifolds 112, or collectors 115 may be integrally formed as a single, unitary component. In still another instance, all or part of the second conduit 120, including one or more inlet portions 121 or outlet portions 122 may be formed as a single, unitary component. Still further, certain combinations of portions of the first conduit 110, second conduit 120, and third conduit 123 may be formed integrally to one another. For instance, the outlet manifold 112 may be formed as a single, unitary component with the inlet portion 121. In another instance, casings surrounding the compressor section 21 may be formed integrally with the inlet manifold 111. The collector 115 may be formed integrally with the first heat exchanger 141. The second heat exchanger 142 may be formed integrally with the outlet portion 122.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A method of operating a gas turbine engine having a compressor section and a turbine section in serial flow arrangement, a first conduit in fluid communication with the compressor section and the turbine section, a first heat exchanger positioned in thermal communication with a flow of air through the first conduit, a second conduit in fluid communication with the first conduit at a location downstream of the first heat exchanger and in fluid communication with a second location at the turbine section, and a flow control device positioned in flow communication with the second conduit, the method comprising: extracting the flow of air from the compressor section into the first conduit; flowing the extracted flow of air through the first conduit to the a first location at the turbine section, wherein the second conduit is in fluid communication with the turbine section at a second location; flowing a heat transfer fluid to the first heat exchanger, the heat transfer fluid in thermal communication with the extracted flow of air through the first conduit via the first heat exchanger; and modulating, via the flow control device, a portion of the flow of air extracted from the first conduit to the second conduit downstream of the first heat exchanger.

The method of one or more of these clauses, further comprising: operating the engine between approximately 75% and approximately 90% of an overall power output of the engine.

The method of one or more of these clauses, wherein extracting the flow of air from the compressor section comprises extracting the flow of air from the compressor section at a compressor location having an airflow pressure between approximately 20 pounds per square inch and approximately 60 pounds per square inch while operating the engine between approximately 75% and approximately 90% of the overall power output.

The method of one or more of these clauses, further comprising: operating the engine at an operating condition corresponding to between approximately 55% and approximately 75% of an operating envelope; and wherein extracting the flow of air from the compressor section comprises extracting the flow of air from the compressor section at a compressor location having an airflow pressure between approximately 20 pounds per square inch and approximately 60 pounds per square inch during the operating condition corresponding to between approximately 55% and approximately 75% of the operating envelope.

The method of one or more of these clauses, wherein the compressor section comprises a low speed compressor and a high speed compressor, and wherein the turbine section comprises a low speed turbine, a high speed turbine, and a turbine frame positioned between the low speed turbine and the high speed turbine, and wherein the first location at the turbine section is at the turbine frame, and wherein the first conduit extends in fluid communication from the high speed compressor to the turbine frame.

The method of one or more of these clauses, wherein the first conduit is configured as a fixed area flowpath from the compressor section to the turbine section, and wherein the flow control device defines a variable area flowpath at the second conduit, and wherein flowing the extracted flow of air through the first conduit to the first location at the turbine section is a continuous flow through an operating condition of the engine, and wherein modulating the portion of the flow of air extracted from the first conduit to the second conduit comprises providing a variable flow to the second location at the turbine section.

The method of one or more of these clauses, wherein the gas turbine engine further comprises: a clearance control system positioned at the second location at the turbine section; and wherein the method further comprises: selectively altering a tip clearance at the clearance control system based on the portion of the flow of air extracted from the first conduit to the second conduit.

The method of one or more of these clauses, wherein the gas turbine engine comprises: a third conduit extended from the flow control device and in fluid communication with a third location at the turbine section; wherein the method further comprises: modulating, via the flow control device, a second portion of the flow of air extracted from the first conduit to the third conduit extended from the flow control device.

The method of one or more of these clauses, wherein the gas turbine engine further comprises: a fan section, wherein a bypass airflow passage is formed downstream of the fan section and around an outer casing surrounding the compressor section and the turbine section; and a second heat exchanger positioned at the second conduit downstream of the flow control device and upstream of the second location at the turbine section, wherein the second heat exchanger allows for thermal communication of a flow of bypass air from the bypass airflow passage with the portion of the flow of air extracted to the second conduit; wherein the method further comprises: thermally communicating, via the second heat exchanger, the flow of bypass air with the portion of the flow of air extracted to the second conduit.

A gas turbine engine, the gas turbine engine comprising: a compressor section and a turbine section in serial flow arrangement; a first conduit extended from the compressor section to the turbine section, the first conduit in fluid communication with the compressor section and the turbine section to communicate a flow of air from the compressor section to a first location at the turbine section; a first heat exchanger positioned in thermal communication with the flow of air through the first conduit; a second conduit in fluid communication with the first conduit at a location downstream of the first heat exchanger and in fluid communication with a second location at the turbine section; and a flow control device positioned in flow communication with the second conduit for selectively changing an amount of the flow of air from the first conduit through the second conduit.

The gas turbine engine of one or more of these clauses, wherein the second conduit comprises an inlet portion and an outlet portion, wherein the inlet portion is fluidly coupled to the first conduit and the flow control device, and wherein the outlet portion is fluidly coupled to the flow control device and the second location of the turbine section.

The gas turbine engine of one or more of these clauses, the gas turbine engine comprising: a second heat exchanger in thermal communication with a flow of air through the outlet portion of the second conduit and upstream of the second location at the turbine section.

The gas turbine engine of one or more of these clauses, the gas turbine engine comprising: a fan section, wherein a bypass airflow passage is formed downstream of the fan section and around an outer casing surrounding the compressor section and the turbine section, wherein the fan section provides a flow of bypass air to the bypass airflow passage during operation of the gas turbine engine, and wherein the second heat exchanger provides the flow of bypass air at the bypass airflow passage into thermal communication with the flow of air at the outlet portion of the second conduit.

The gas turbine engine of one or more of these clauses, the gas turbine engine comprising: a third conduit extended in fluid communication from the flow control device to a third location at the turbine section.

The gas turbine engine of one or more of these clauses, wherein the flow control device is a three-way valve configured to selectively change the amount of the flow of air from the first conduit through an inlet portion of the second conduit, and wherein the flow control device is configured to egress at least a portion of the flow of air to the third conduit, an outlet portion of the second conduit, or both.

The gas turbine engine of one or more of these clauses, the turbine section comprising: a first turbine assembly surrounded by an outer wall forming a gas flowpath, and wherein the first turbine assembly comprises an outer casing wall surrounding the outer wall, wherein the outer wall and the outer casing wall together form a cavity, and wherein the third location at the turbine section is at the cavity.

The gas turbine engine of one or more of these clauses, the turbine section comprising: a first turbine assembly; a clearance control system, wherein the second location at the turbine section is at the clearance control system and wherein the clearance control system is operably coupled to the first turbine assembly; and a turbine frame positioned in serial flow arrangement downstream of the first turbine assembly, and wherein the first location at the turbine section is at the turbine frame.

The gas turbine engine of one or more of these clauses, the gas turbine engine comprising: a fluid system configured to provide a flow of heat transfer fluid in thermal communication with the flow of air via the first heat exchanger.

The gas turbine engine of one or more of these clauses, wherein the first conduit comprises: a plurality of inlet manifolds configured to receive the flow of air from a plurality of circumferential compressor locations at the compressor section; and a collector configured to receive the flow of air from the plurality of inlet manifolds, and wherein the collector is fluidly coupled to the first heat exchanger to provide the flow of air in thermal communication to the first heat exchanger.

An airflow delivery system for a gas turbine engine, the gas turbine engine comprising a compressor section and a turbine section in serial flow arrangement, the airflow delivery system comprising: a first conduit configured to extend from the compressor section to the turbine section in flow communication with the compressor section and the turbine section to communicate a flow of air from the compressor section to a first location at the turbine section when installed in the gas turbine engine; a first heat exchanger positioned to be in thermal communication with the flow of air at the first conduit; a second conduit extending from the first conduit downstream of the first heat exchanger, wherein the second conduit is configured to extend in fluid communication to a second location at the turbine section; and a flow control device positioned at the second conduit, wherein the flow control device is configured to selectively change an amount of the flow of air from the first conduit through the second conduit.

What is claimed is:

1. A method of operating a gas turbine engine having a compressor section and a turbine section in serial flow arrangement, a first conduit in fluid communication with the compressor section and the turbine section, a first heat exchanger positioned in thermal communication with a flow of air through the first conduit, a second conduit in fluid communication with the first conduit at a location downstream of the first heat exchanger and in fluid communication with the turbine section, and a flow control device positioned in flow communication with the second conduit, the method comprising:

extracting the flow of air from the compressor section into the first conduit;

flowing the extracted flow of air through the first conduit to a first location at the turbine section, wherein the second conduit is in fluid communication with the turbine section at a second location;

flowing a heat transfer fluid to the first heat exchanger, the heat transfer fluid in thermal communication with the extracted flow of air through the first conduit via the first heat exchanger;

modulating, via the flow control device, a portion of the flow of air extracted from the first conduit to the second conduit downstream of the first heat exchanger; and operating the engine at an operating condition corresponding to between approximately 55% and approximately 75% of an operating envelope;

wherein extracting the flow of air from the compressor section comprises extracting the flow of air from the compressor section at a compressor location having an airflow pressure between approximately 20 pounds per square inch and approximately 60 pounds per square inch during the operating condition corresponding to between approximately 55% and approximately 75% of the operating envelope.

2. The method of claim 1, further comprising:

operating the engine between approximately 75% and approximately 90% of an overall power output of the engine.

3. The method of claim 2, wherein extracting the flow of air from the compressor section comprises extracting the flow of air from the compressor section at a compressor location having an airflow pressure between approximately 20 pounds per square inch and approximately 60 pounds per square inch while operating the engine between approximately 75% and approximately 90% of the overall power output.

4. The method of claim 1, wherein the compressor section comprises a low speed compressor and a high speed compressor, and wherein the turbine section comprises a low speed turbine, a high speed turbine, and a turbine frame positioned between the low speed turbine and the high speed turbine, and wherein the first location at the turbine section is at the turbine frame, and wherein the first conduit extends in fluid communication from the high speed compressor to the turbine frame.

5. The method of claim 1, wherein the first conduit is configured as a fixed area flowpath from the compressor section to the turbine section, and wherein the flow control device defines a variable area flowpath at the second conduit, and wherein flowing the extracted flow of air through the first conduit to the first location at the turbine section is a continuous flow through an operating condition of the engine, and wherein modulating the portion of the flow of air extracted from the first conduit to the second conduit comprises providing a variable flow to the second location at the turbine section.

6. The method of claim 1, wherein the gas turbine engine further comprises:

a clearance control system positioned at the second location at the turbine section; and wherein the method further comprises:

selectively altering a tip clearance at the clearance control system based on the portion of the flow of air extracted from the first conduit to the second conduit.

7. The method of claim 1, wherein the gas turbine engine comprises:

a third conduit extended from the flow control device and in fluid communication with a third location at the turbine section;

wherein the method further comprises:

modulating, via the flow control device, a second portion of the flow of air extracted from the first conduit to the third conduit extended from the flow control device.

8. The method of claim 1, wherein the gas turbine engine further comprises:

a fan section, wherein a bypass airflow passage is formed downstream of the fan section and around an outer casing surrounding the compressor section and the turbine section; and a second heat exchanger positioned at the second conduit downstream of the flow control device and upstream of the second location at the turbine section, wherein the second heat exchanger allows for thermal communication of a flow of bypass air from the bypass airflow passage with the portion of the flow of air extracted to the second conduit;

wherein the method further comprises: thermally communicating, via the second heat exchanger, the flow of bypass air with the portion of the flow of air extracted to the second conduit.

9. The method of claim 6, wherein the gas turbine engine further comprises:

a fan section, wherein a bypass airflow passage is formed downstream of the fan section and around an outer casing surrounding the compressor section and the turbine section; and a second heat exchanger positioned at the second conduit downstream of the flow control device and upstream of the second location at the turbine section, wherein the second heat exchanger allows for thermal communication of a flow of bypass air from the bypass airflow passage with the portion of the flow of air extracted to the second conduit;

wherein the method further comprises: thermally communicating, via the second heat exchanger, the flow of bypass air with the portion of the flow of air extracted to the second conduit.

10. The method of claim 9, wherein the gas turbine engine comprises:

a third conduit extended from the flow control device and in fluid communication with a third location at the turbine section;

wherein the method further comprises:

modulating, via the flow control device, a second portion of the flow of air extracted from the first conduit to the third conduit extended from the flow control device.

11. The method of claim 1, wherein the heat transfer fluid is a liquid fuel;

wherein the method further comprises:

extracting heat from the flow of air through the first conduit and transmitting the heat to the liquid fuel.

12. The method of claim 11, wherein the gas turbine engine comprises:

a combustion section;

wherein the method further comprises:

providing the liquid fuel to the combustion section.

13. A method of operating a gas turbine engine having a compressor section and a turbine section in serial flow arrangement, a first conduit in fluid communication with the compressor section and the turbine section, a first heat exchanger positioned in thermal communication with a flow of air through the first conduit, a second conduit in fluid communication with the first conduit at a location downstream of the first heat exchanger and in fluid communication with the turbine section, and a flow control device positioned in flow communication with the second conduit, the method comprising:

extracting the flow of air from the compressor section into the first conduit;

flowing the extracted flow of air through the first conduit to a first location at the turbine section, wherein the second conduit is in fluid communication with the turbine section at a second location;

flowing a heat transfer fluid to the first heat exchanger, the heat transfer fluid in thermal communication with the extracted flow of air through the first conduit via the first heat exchanger;

modulating, via the flow control device, a portion of the flow of air extracted from the first conduit to the second conduit downstream of the first heat exchanger;

operating the engine between approximately 75% and approximately 90% of an overall power output of the engine, wherein extracting the flow of air from the compressor section comprises extracting the flow of air from the compressor section at a compressor location having an airflow pressure between approximately 20 pounds per square inch and approximately 60 pounds per square inch while operating the engine between approximately 75% and approximately 90% of the overall power output.

* * * * *